US011703658B2

(12) United States Patent
Chang et al.

(10) Patent No.: US 11,703,658 B2
(45) Date of Patent: Jul. 18, 2023

(54) CAMERA MODULE HAVING REFLECTIVE ELEMENT AND ELECTRONIC DEVICE

(71) Applicant: LARGAN DIGITAL CO., LTD., Taichung (TW)

(72) Inventors: Lin An Chang, Taichung (TW); Ming-Ta Chou, Taichung (TW); Wen-Hung Hsu, Taichung (TW); Te-Sheng Tseng, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 322 days.

(21) Appl. No.: 17/076,663

(22) Filed: Oct. 21, 2020

(65) Prior Publication Data

US 2022/0082786 A1 Mar. 17, 2022

(30) Foreign Application Priority Data

Sep. 16, 2020 (TW) ................................. 109131904

(51) Int. Cl.
*G02B 7/09* (2021.01)
*G02B 13/00* (2006.01)
(Continued)

(52) U.S. Cl.
CPC ........... *G02B 7/09* (2013.01); *G02B 13/0065* (2013.01); *G02B 27/646* (2013.01); *G03B 5/00* (2013.01);
(Continued)

(58) Field of Classification Search
CPC .... G02B 7/09; G02B 13/0065; G02B 27/646; G02B 7/08; G02B 7/1805; G02B 7/02;
(Continued)

(56) References Cited

U.S. PATENT DOCUMENTS 10,048,507 B2 8/2018 Nomura et al.
10,133,038 B2 11/2018 Hu et al.
(Continued)

FOREIGN PATENT DOCUMENTS

CN 208207393 U 12/2018

OTHER PUBLICATIONS

TW Office Action in Application No. 109131904 dated Apr. 14, 2021.

*Primary Examiner* — Cara E Rakowski
(74) *Attorney, Agent, or Firm* — Maschoff Brennan

(57) ABSTRACT

A camera module includes a base, a lens module, a reflection module, a longitudinal guiding bar, a transverse guiding bar and a shaft guiding bar. The lens module has an optical axis and is disposed on the base. The reflection module includes a reflective element disposed on the base and located on an object side of the lens module. The longitudinal and transverse guiding bars are disposed between the base and the lens module and respectively extend in a first direction parallel to the optical axis and a second direction perpendicular to the optical axis. The shaft guiding bar is disposed between the base and the reflection module and extends in the second direction. The lens module is movable along the longitudinal and transverse guiding bars, respectively, and the reflective element is rotatable by taking the shaft guiding bar as a rotation axis.

18 Claims, 20 Drawing Sheets

(51) Int. Cl.
*G03B 13/36* (2021.01)
*G03B 5/00* (2021.01)
*G02B 27/64* (2006.01)

(52) U.S. Cl.
CPC ...... *G03B 13/36* (2013.01); *G03B 2205/0015* (2013.01)

(58) Field of Classification Search
CPC .. G03B 5/00; G03B 13/36; G03B 2205/0015; G03B 17/17; G03B 30/00; G03B 2205/0023; G03B 3/10
See application file for complete search history.

(56) References Cited

U.S. PATENT DOCUMENTS

| | | | |
|---|---|---|---|
| 10,261,337 B2 | 4/2019 | Yeon et al. | |
| 10,269,859 B2 | 4/2019 | Hu et al. | |
| 10,302,899 B2 | 5/2019 | Miyoshi | |
| 10,303,042 B2 | 5/2019 | Yu et al. | |
| 10,334,146 B2 | 6/2019 | Im et al. | |
| 10,394,046 B2 | 8/2019 | Jeong et al. | |
| 10,401,641 B2 | 9/2019 | Hu et al. | |
| 10,416,472 B2 | 9/2019 | Jeong et al. | |
| 10,416,473 B2 | 9/2019 | Lee et al. | |
| 10,481,410 B2 | 11/2019 | Kim et al. | |
| 10,516,773 B2 | 12/2019 | Yoon et al. | |
| 10,534,194 B2 | 1/2020 | Lee et al. | |
| 10,564,442 B2 | 2/2020 | Seol et al. | |
| 10,571,093 B2 | 2/2020 | Part et al. | |
| 10,594,911 B2 | 3/2020 | Im et al. | |
| 10,678,062 B2 | 6/2020 | Im et al. | |
| 10,700,119 B2 | 6/2020 | Hu et al. | |
| 2009/0060485 A1* | 3/2009 | Takahashi | G03B 5/00 396/55 |
| 2016/0062133 A1* | 3/2016 | Espersen | G02B 27/646 359/557 |
| 2018/0267271 A1* | 9/2018 | Tseng | G02B 13/0045 |
| 2019/0086638 A1* | 3/2019 | Lee | G02B 9/60 |
| 2020/0174270 A1 | 6/2020 | Enta et al. | |
| 2020/0301160 A1* | 9/2020 | Fujisaki | G03B 5/06 |
| 2021/0157089 A1* | 5/2021 | Fujinaka | G02B 7/04 |

* cited by examiner

CAMERA MODULE HAVING REFLECTIVE ELEMENT AND ELECTRONIC DEVICE

RELATED APPLICATIONS

This application claims priority to Taiwan Application 109131904, filed on Sep. 16, 2020, which is incorporated by reference herein in its entirety.

BACKGROUND

Technical Field

The present disclosure relates to a camera module and an electronic device, more particularly to a camera module having a reflective element, which is applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

In recent years, there is an increasing demand for electronic devices featuring compact size, but conventional optical systems, especially the telephoto optical systems with a long focal length, are difficult to meet both the requirements of high image quality and compactness. Conventional telephoto optical systems usually have shortcomings of overly long total length, poor image quality or overly large size, which is unable to meet the requirements of the current technology trends. To achieve compactness, the optical systems may be configured to have a folded optical axis so as to reduce the dimension of the optical systems in a specific direction, thereby reducing the total system size. Moreover, the optical systems can be configured with anti-vibration function for achieving high image quality. However, to meet the abovementioned requirements, a driving unit of complex structure is required to drive an optical axis folding element, which results in more complex structure and more weight of the optical systems.

Accordingly, how to improve the optical systems for simplifying the structure of the lens assembly, achieving a compact size and maintaining high image quality so as to meet the requirement of high-end-specification electronic devices is an important topic in this field nowadays.

SUMMARY

According to one aspect of the present disclosure, a camera module includes a base, a lens module, a reflection module, a longitudinal guiding bar, a transverse guiding bar and a shaft guiding bar. The lens module has an optical axis, and the lens module is disposed on the base. The reflection module includes a reflective element disposed on the base, and the reflective element is located on an object side of the lens module. The longitudinal guiding bar is disposed between the base and the lens module, and the longitudinal guiding bar extends in a first direction parallel to the optical axis. The transverse guiding bar is disposed between the base and the lens module, and the transverse guiding bar extends in a second direction perpendicular to the optical axis. The shaft guiding bar is disposed between the base and the reflection module, and the shaft guiding bar extends in the second direction. In addition, the lens module is movable along the longitudinal guiding bar and the transverse guiding bar, respectively, and the reflective element is rotatable by taking the shaft guiding bar as a rotation axis.

According to another aspect of the present disclosure, a camera module includes a base, a lens module, a reflection module, a longitudinal guiding bar and a shaft guiding bar. The lens module has an optical axis, and the lens module is disposed on the base. The reflection module includes a reflective element disposed on the base, and the reflective element is located on an object side of the lens module. The longitudinal guiding bar is disposed between the base and the lens module, and the longitudinal guiding bar extends in a first direction parallel to the optical axis. The shaft guiding bar is disposed between the base and the reflection module, and the shaft guiding bar extends in a second direction perpendicular to the optical axis. In addition, the lens module is movable along the longitudinal guiding bar, and the reflective element is rotatable by taking the shaft guiding bar as a rotation axis.

According to another aspect of the present disclosure, a camera module includes a base, a lens module, a reflection module, a transverse guiding bar and a shaft guiding bar. The lens module has an optical axis, and the lens module is disposed on the base. The reflection module includes a reflective element disposed on the base, and the reflective element is located on an object side of the lens module. The transverse guiding bar is disposed between the base and the lens module, and the transverse guiding bar extends in a direction perpendicular to the optical axis. The shaft guiding bar is disposed between the base and the reflection module, and the shaft guiding bar extends in a direction perpendicular to the optical axis. In addition, the lens module is movable along the transverse guiding bar, and the reflective element is rotatable by taking the shaft guiding bar as a rotation axis.

According to another aspect of the present disclosure, a camera module includes a base, a lens module, a reflection module, a longitudinal guiding bar and a transverse guiding bar. The lens module has an optical axis, and the lens module is disposed on the base. The reflection module includes a reflective element disposed on the base, and the reflective element is located on an object side of the lens module. The longitudinal guiding bar is disposed between the base and the lens module, and the longitudinal guiding bar extends in a first direction parallel to the optical axis. The transverse guiding bar is disposed between the base and the lens module, and the transverse guiding bar extends in a second direction perpendicular to the optical axis. In addition, the lens module is movable along the longitudinal guiding bar and the transverse guiding bar, respectively.

According to another aspect of the present disclosure, an electronic device includes one of the aforementioned camera modules.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
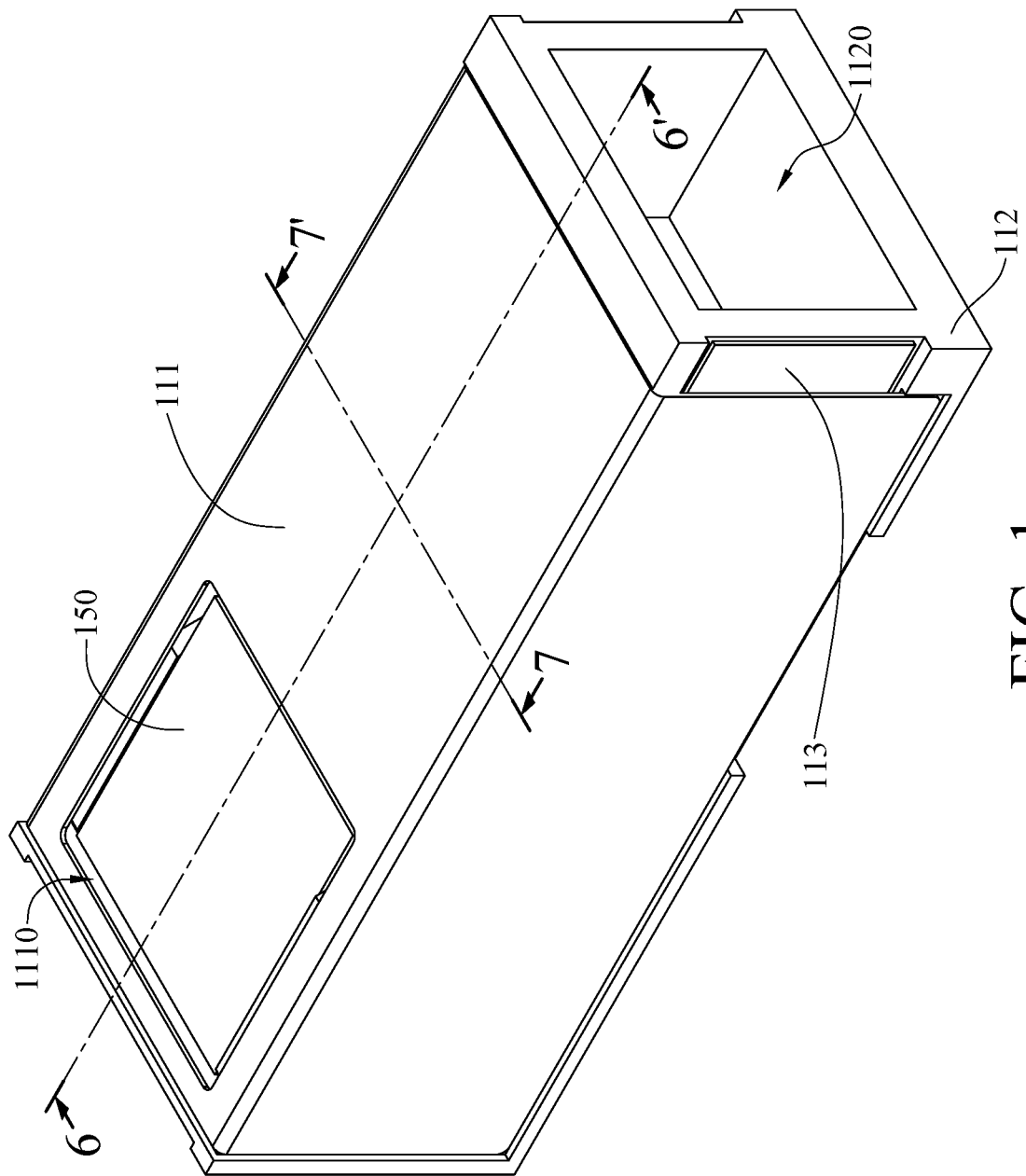
FIG. 1 is a perspective view of a camera module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides a camera module having a reflective element, and the camera module includes a base, a lens module and a reflection module, and the camera module having a reflective element further includes at least two of a longitudinal guiding bar, a transverse guiding bar and a shaft guiding bar.

The lens module has an optical axis, and the lens module is disposed on the base. The reflection module includes a reflective element configured to deflect an optical path of incident light. The reflective element is disposed on the base, and the reflective element is located on an object side of the lens module. Moreover, the base can include a plurality of sub-bases, but the present disclosure is not limited thereto. Moreover, the lens module can include a lens element holder and at least one lens element, and the lens element is disposed on the lens element holder. Moreover, the reflection module can further include a reflective element holder for the reflective element to be disposed thereon, and the reflective element holder is disposed on the base. Moreover, the reflective element can be, for example, a prism or a reflective mirror, but the present disclosure is not limited thereto.

The longitudinal guiding bar is disposed between the base and the lens module, and the longitudinal guiding bar extends in a first direction parallel to the optical axis. The transverse guiding bar is disposed between the base and the lens module, and the transverse guiding bar extends in a second direction perpendicular to the optical axis. The shaft guiding bar is disposed between the base and the reflection module, and the shaft guiding bar extends in the second direction. In addition, the lens module is movable along the longitudinal guiding bar; that is, the lens module can be moved in the first direction with the guidance of the longitudinal guiding bar. Furthermore, the lens module is movable along the transverse guiding bar; that is, the lens module can be moved in the second direction with the guidance of the transverse guiding bar. Therefore, the lens module can achieve image focusing and image stabilization in one dimension by moving along the longitudinal guiding bar and the transverse guiding bar, respectively. Moreover, the reflective element of the reflection module can rotate by taking the shaft guiding bar as a rotation axis. Therefore, it is favorable for achieving image stabilization in another dimension. Moreover, the longitudinal guiding bar and the transverse guiding bar can be both cylindrical, and the shaft guiding bar can be cylindrical. Therefore, it is favorable for minimizing friction between contact surfaces of one sliding component and the guiding bar(s) so as to increase sliding smoothness thereof when the sliding component is driven. In this specification, the term of "one element being perpendicular to another element" can indicate that an angle between two elements (e.g., two lines, two surfaces, or one line and one surface) is 90 degrees or approximately 90 degrees, and the term of "one element being parallel to another element" can indicate that an angle between two elements (e.g., two lines, two surfaces, or one line and one surface) is 180 degrees or approximately 180 degrees.

According to the present disclosure, the camera module having a reflective element achieves effects of auto focusing and image stabilization by having the design of guiding bar(s). Furthermore, the space arrangement of the above guiding bars is favorable for maintaining the balance of the camera module and achieving compactness of the module.

According to the present disclosure, the camera module can further include at least one object-side lens element located on an object side of the reflective element and disposed adjacent to the reflective element in a third direction, wherein the third direction is perpendicular to the first direction and perpendicular to the second direction. Therefore, the reflective element located between two lens elements (or between two lens groups) along an optical path is favorable for more flexibly utilizing the space of the camera module for satisfying high-end product specifications.

According to the present disclosure, the camera module can further include a movable frame disposed between the longitudinal guiding bar and the transverse guiding bar, and the movable frame is movable along one of the longitudinal guiding bar and the transverse guiding bar; that is, the movable frame can be moved in the first direction with the guidance of the longitudinal guiding bar or moved in the second direction with the guidance of the transverse guiding bar. Therefore, it is favorable for achieving movement stabilization of the lens module in the first direction and the second direction.

According to the present disclosure, the longitudinal guiding bar and the transverse guiding bar can be fixed to one of the base, the movable frame and the lens element holder via an adhesive, and the shaft guiding bar can be fixed to one of the base and the reflective element hold via an adhesive, but the present disclosure is not limited thereto. For example, in one aspect, the guiding bar(s) are fixed to one of the base, the movable frame, the lens element holder and the reflective element holder through insert-molding.

According to the present disclosure, the camera module can further include at least one cushion element, and the cushion element includes a fixed part, a contact part and an elastic part. The fixed part is fixed to one of the base and the lens module, the contact part corresponds to the other of the base and the lens module, and the elastic part is connected to the fixed part and the contact part. Therefore, it is favorable for reducing the wear and tear on the lens module due to the collision between the lens module and the guiding bar so as to protect the guiding bar and thus prevent the guiding bar from falling off. The cushion element can be configured to restrict the movement of the lens module in a predetermined range, and when the lens module is moved along the longitudinal guiding bar or the transverse guiding bar, the cushion element can prevent the lens module from hitting the base. The present disclosure is not limited to the above arrangement of the fixed part and the contact part. In some aspects, the fixed part of the at least one cushion element of the camera module is fixed to one of the movable frame and the lens module, and the contact part of the at least one cushion element of the camera module corresponds to the other of the movable frame and the lens module.

According to the present disclosure, the camera module can further include a first driving mechanism, and the first driving mechanism includes a first driving magnet and a first driving coil. The first driving magnet is disposed on the lens module, the first driving coil corresponds to the first driving magnet, and the first driving mechanism is configured to drive the lens module to move in the first direction. Therefore, a driving force to the lens module in the first direction can be provided.

According to the present disclosure, the camera module can further include a second driving mechanism, and the second driving mechanism includes a second driving magnet and a second driving coil. The second driving magnet is disposed on the lens module, the second driving coil corresponds to the second driving magnet, and the second driving mechanism is configured to drive the lens module to move in the second direction. Therefore, a driving force to the lens module in the second direction can be provided.

According to the present disclosure, the camera module can further include a ferromagnetic element disposed on the base, and the ferromagnetic element corresponds to one of the first driving magnet and the second driving magnet so as to together provide a force of attraction to the lens module in a direction towards the base, such that the longitudinal guiding bar and the transverse guiding bar support the lens module. Therefore, it is favorable for easy assembling so as to increase assembling efficiency.

One of the longitudinal guiding bar and the transverse guiding bar can be made of ferromagnetic material, and the ferromagnetic longitudinal guiding bar or transverse guiding bar can be fixed to the base and correspond to one of the first driving magnet and the second driving magnet so as to together provide a force of attraction to the lens module in a direction towards the base, such that the longitudinal guiding bar and the transverse guiding bar support the lens module. Therefore, it is favorable for achieving a consistent driving force direction by using the driving magnet to attract the guiding bar so as to prevent the lens module from tilting.

According to the present disclosure, the camera module can further include a rotation driving mechanism, and the rotation driving mechanism includes a rotation driving magnet and a rotation driving coil. The rotation driving magnet is disposed on the reflection module, the rotation driving coil corresponds to the rotation driving magnet, and the rotation driving mechanism is configured to drive the reflection module to rotate by taking the shaft guiding bar as a rotation axis. Therefore, a driving force to the reflection module to rotate can be provided.

According to the present disclosure, the camera module can further include a preload element connected to the base and the reflection module, and the preload element is configured to provide a preload force to the reflection module in a direction towards the base, such that the shaft guiding bar located between the base and the reflection module supports the reflection module. Therefore, providing a preload force with a stronger structure is favorable for preventing the guiding bar from being easily damaged. Moreover, the preload element can be, for example, a flat spring.

According to the present disclosure, the camera module can further include a damping element disposed between the preload element and the base, and the damping element is configured to absorb the vibration of the reflection module. Therefore, it is favorable for increasing the steadiness of the lens module so as to prevent blurry images.

When a maximum field of view of the lens module is FOV, the following condition can be satisfied: 3 degrees<FOV<40 degrees. Therefore, it is favorable for providing a telephoto camera module having a small field of view.

When a length of the longitudinal guiding bar is L1, and a length of the transverse guiding bar is L2, the following condition can be satisfied: 0.1<L2/L1<2.0. Therefore, the length ratio of the guiding bars is favorable for ensuring a sufficient space for driven components to move therein within a small module size configuration. Please refer to FIG. 6 and FIG. 7, which respectively show schematic views of L1 and L2 according to the 1st embodiment of the present disclosure.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
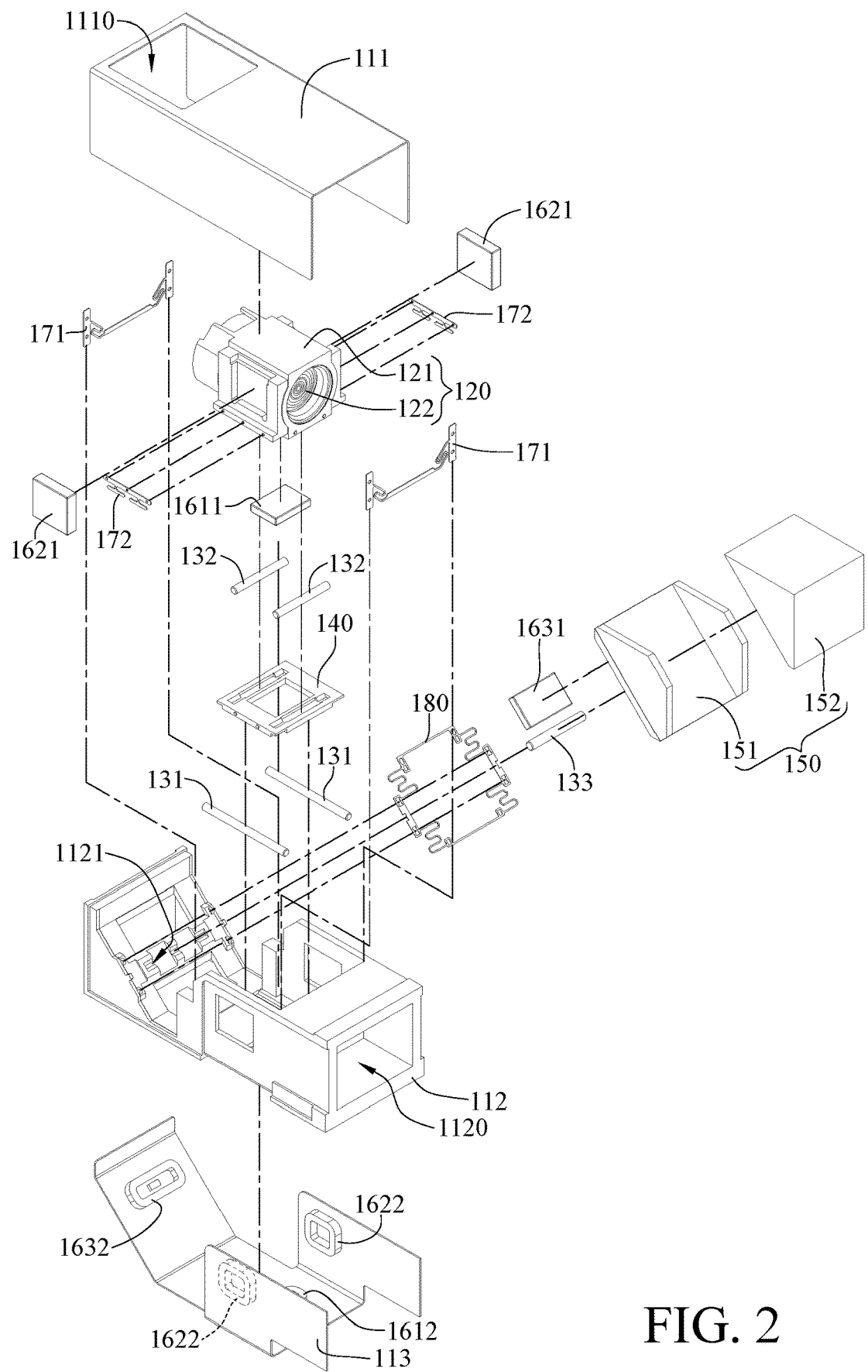
FIG. 2 is an exploded view of the camera module in FIG. 1.
Figure 3:
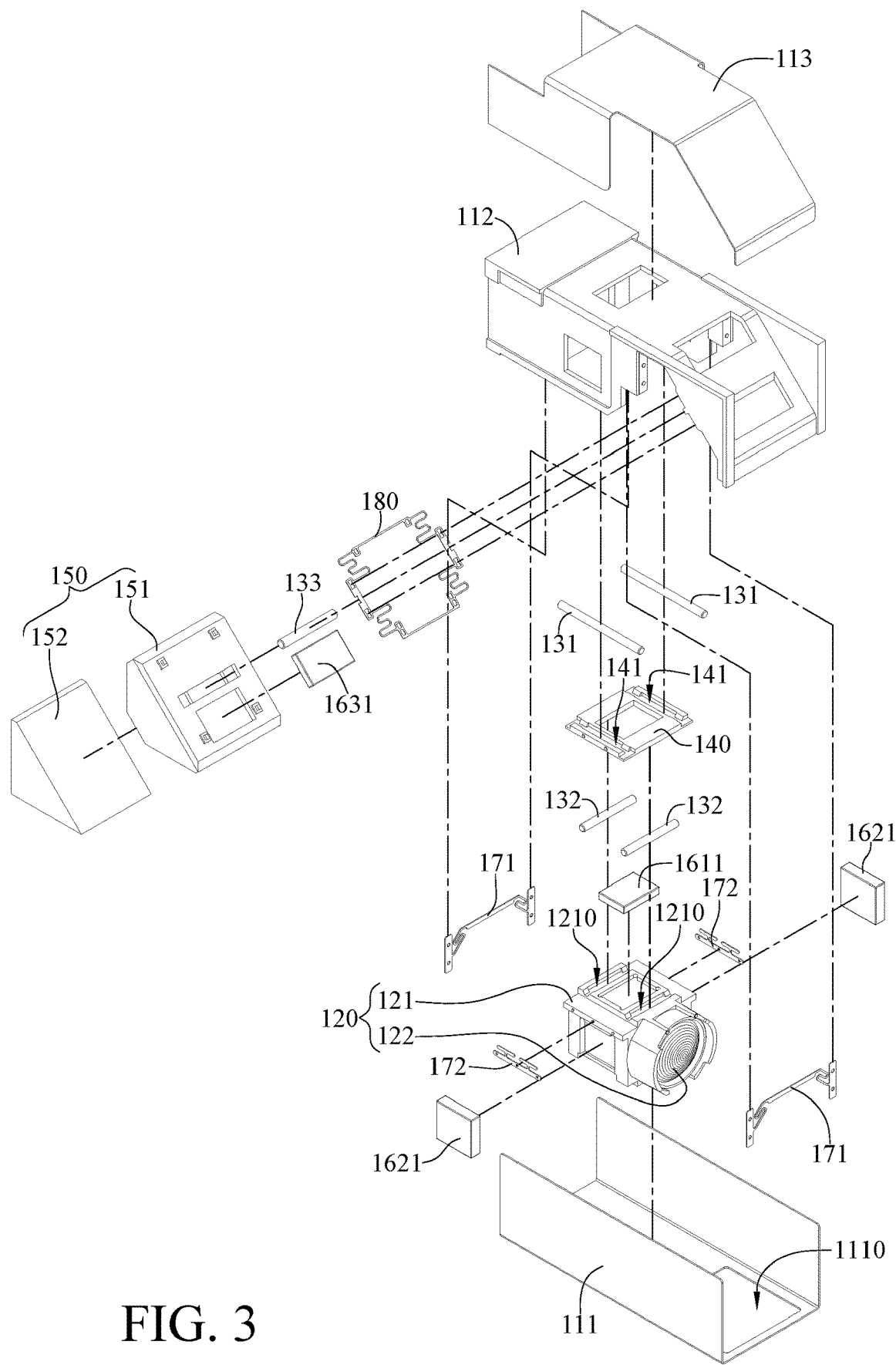
FIG. 3 is another exploded view of the camera module in FIG. 1.
Figure 4:
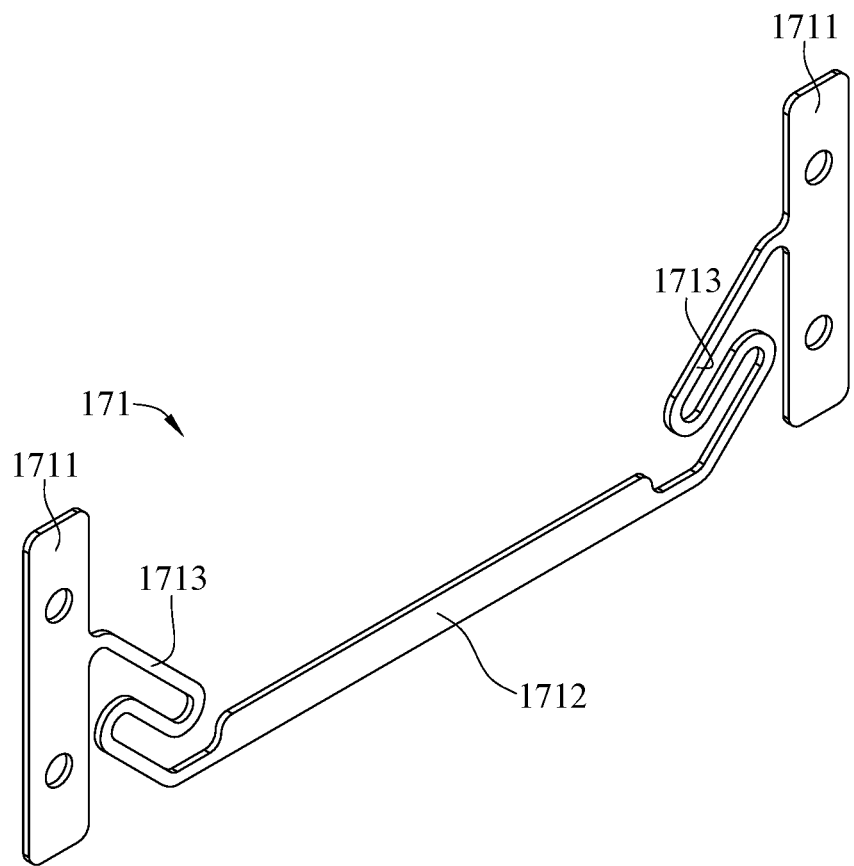
FIG. 4 is a perspective view of one of the first cushion elements in FIG. 2.
Figure 5:
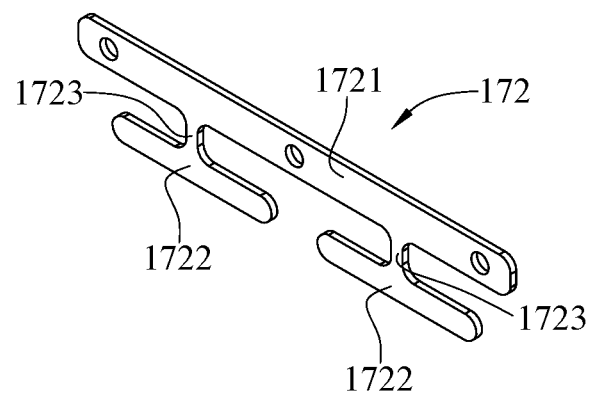
FIG. 5 is a perspective view of one of the second cushion elements in FIG. 2.
Figure 6:
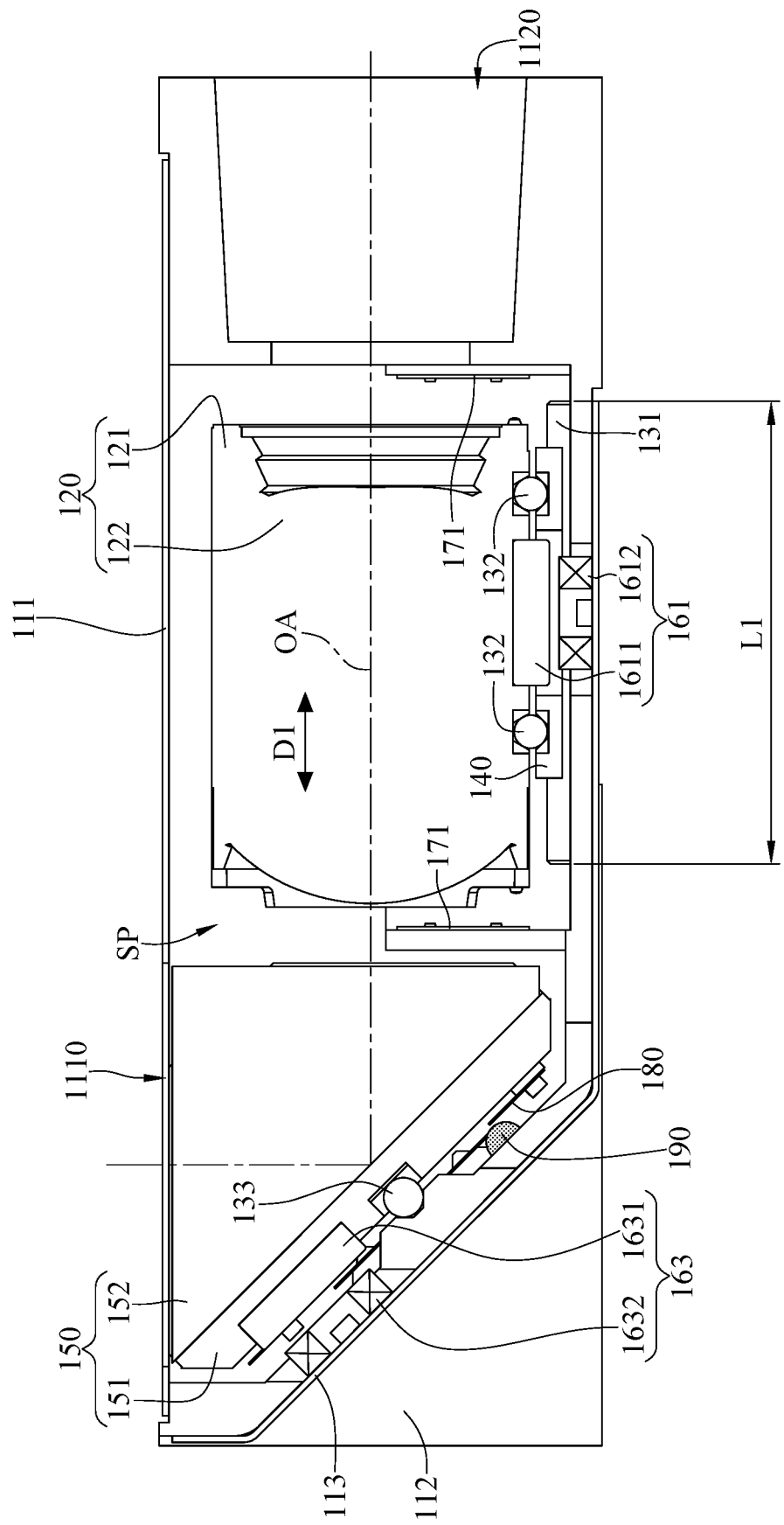
FIG. 6 is a cross-sectional view of the camera module along line 6-6' in FIG. 1.
Figure 7:
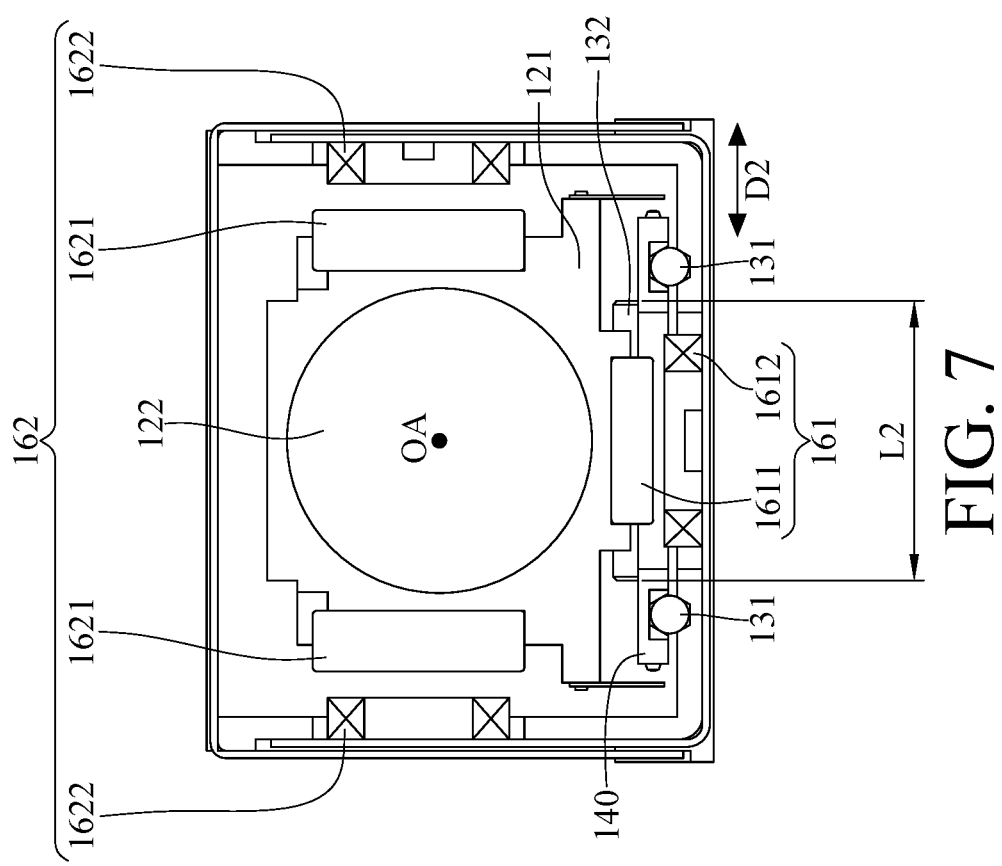
FIG. 7 is a cross-sectional view of the camera module along line 7-7' in FIG. 1.

Please refer to FIG. 1 to FIG. 7, where FIG. 1 is a perspective view of a camera module according to the 1st embodiment of the present disclosure, FIG. 2 is an exploded view of the camera module in FIG. 1, FIG. 3 is another exploded view of the camera module in FIG. 1, FIG. 4 is a perspective view of one of the first cushion elements in FIG. 2, FIG. 5 is a perspective view of one of the second cushion elements in FIG. 2, FIG. 6 is a cross-sectional view of the camera module along line 6-6' in FIG. 1, and FIG. 7 is a cross-sectional view of the camera module along line 7-7' in FIG. 1.

A camera module 10 includes a casing 111, a base 112, a lens module 120, two longitudinal guiding bars 131, a movable frame 140, two transverse guiding bars 132, a reflection module 150, a shaft guiding bar 133, a printed circuit board 113, a first driving mechanism 161, a second driving mechanism 162, a rotation driving mechanism 163, two first cushion elements 171, two second cushion elements 172, a preload element 180 and a damping element 190.

The casing 111 is disposed on the base 112, and the casing 111 and the base 112 together form a storage space SP. The casing 111 has an aperture 1110 for light entering, and the base 112 has an opening 1120 for light exiting.

The lens module 120 has an optical axis OA, and the lens module 120 includes a lens element holder 121 and at least one lens element 122. The lens element holder 121 is located in the storage space SP and movably disposed on the base 112, and the at least one lens element 122 is disposed on the lens element holder 121.

The longitudinal guiding bars 131 are disposed between the base 112 and the lens module 120 and fixed to the base 112, and the longitudinal guiding bars 131 extend in a first direction D1 that is parallel to the optical axis OA.

The movable frame 140 is disposed between the longitudinal guiding bars 131 and the lens module 120. The movable frame 140 has two first grooves 141 extending in the first direction D1, the first grooves 141 respectively correspond to the longitudinal guiding bars 131, and the longitudinal guiding bars 131 are slidably located in the first grooves 141, such that the movable frame 140 is slidably disposed on the base 112 and movable along the longitudinal guiding bars 131. The movable frame 140 is movable in the first direction D1 with the guidance of the longitudinal guiding bars 131.

The transverse guiding bars 132 are disposed between the movable frame 140 and the lens module 120 and fixed to the movable frame 140, and the transverse guiding bars 132 extend in a second direction D2 that is perpendicular to the optical axis OA. The lens element holder 121 of the lens module 120 has two second grooves 1210 extending in the second direction D2, the second grooves 1210 respectively correspond to the transverse guiding bars 132, and the transverse guiding bars 132 are slidably located in the second grooves 1210, such that the lens module 120 is slidably disposed on the movable frame 140 and movable along the transverse guiding bars 132. The lens module 120 is movable in the second direction D2 with the guidance of the transverse guiding bars 132. Further, when the movable frame 140 is moved along the longitudinal guiding bars 131, the lens module 120 is also driven by the movable frame 140 to move along the longitudinal guiding bars 131, such that the lens module 120 is movable along the longitudinal guiding bars 131 and the transverse guiding bars 132, respectively, so as to achieve image focusing and image stabilization in one dimension.

The reflection module 150 includes a reflective element holder 151 and a reflective element 152. The reflective element holder 151 is disposed on the base 112. The reflective element 152 is a prism configured to deflect an optical path of incident light, and the reflective element 152 is disposed on the reflective element holder 151 and located on an object side of the lens module 120.

The shaft guiding bar 133 is disposed between the base 112 and the reflection module 150 and fixed to the reflective element holder 151. The shaft guiding bar 133 extends in the second direction D2. The base 112 has a corresponding groove 1121 extending in the second direction D2, the corresponding groove 1121 corresponds to the shaft guiding bar 133, and the shaft guiding bar 133 is rotatably located in the corresponding groove 1121, such that the reflective element 152 is rotatably disposed on the base 112 and rotatable by taking the shaft guiding bar 133 as a rotation axis so as to achieve image stabilization in another dimension.

The printed circuit board 113 is disposed on the base 112 and configured to provide driving current for driving coil(s).

The first driving mechanism 161 includes a first driving magnet 1611 and a first driving coil 1612. The first driving magnet 1611 is disposed on the lens module 120, and the first driving coil 1612 is disposed on the printed circuit board 113 and corresponds to the first driving magnet 1611. The printed circuit board 113 can provide driving current for the first driving coil 1612, and an electromagnetic force generated between the first driving magnet 1611 and the first driving coil 1612 can drive the first driving magnet 1611 to move in the first direction D1 so as to drive the lens module 120 to move in the first direction D1.

The second driving mechanism 162 includes two second driving magnets 1621 and two second driving coils 1622. The second driving magnets 1621 are disposed on two opposite sides of the lens module 120 and located on two sides adjacent to the first driving magnet 1611, the second driving coils 1622 are disposed on two opposite sides of the printed circuit board 113 and located on two sides adjacent to the first driving coil 1612, and the second driving coils 1622 respectively correspond to the second driving magnets 1621. The printed circuit board 113 can provide driving current to the second driving coils 1622, and an electromagnetic force generated between the second driving magnets 1621 and the second driving coils 1622 can drive the second driving magnets 1621 to move in the second direction D2 so as to drive the lens module 120 to move in the second direction D2.

The rotation driving mechanism 163 includes a rotation driving magnet 1631 and a rotation driving coil 1632. The rotation driving magnet 1631 is disposed on the reflective element holder 151 of the reflection module 150 and located on one side of the shaft guiding bar 133, and the rotation driving coil 1632 is disposed on the printed circuit board 113 and corresponds to the rotation driving magnet 1631. The printed circuit board 113 can provide driving current to the rotation driving coil 1632, and an electromagnetic force generated between the rotation driving magnet 1631 and the rotation driving coil 1632 can drive the rotation driving magnet 1631 to rotate by taking the shaft guiding bar 133 as a rotation axis so as to drive the reflection module 150 to rotate by taking the shaft guiding bar 133 as a rotation axis. In this embodiment, the first driving mechanism 161 provides a driving force that makes the coil and magnet thereof have a substantially parallel displacement with respect to each other; each of the second driving mechanism 162 and the rotation driving mechanism 163 provides a driving force that makes the coil(s) and magnet(s) thereof have a substantially perpendicular displacement with respect to each other.

Each of the first cushion elements 171 includes two fixed parts 1711, a contact part 1712 and two elastic parts 1713 connected to the fixed parts 1711 and the contact part 1712. The fixed parts 1711 are fixed to the base 112, and the contact part 1712 corresponds to the lens module 120. The first cushion elements 171 are configured to restrict the movement in the first direction D1 of the lens module 120 within a predetermined range, and when the lens module 120 is moved along the longitudinal guiding bars 131, the first cushion elements 171 can prevent the lens module 120 from hitting the base 112 by the blocking of the contact part 1712.

Each of the second cushion elements 172 includes a fixed part 1721, two contact parts 1722 and two elastic parts 1723 connected to the fixed part 1721 and the contact parts 1722. The fixed part 1721 is fixed to the lens module 120, and the contact parts 1722 correspond to the movable frame 140. The second cushion elements 172 are configured to restrict the movement in the second direction D2 of the lens module 120 within a predetermined range, and when the lens module 120 is moved along the transverse guiding bars 132, the second cushion elements 172 can prevent the lens module 120 from hitting the base 112 by the blocking of the contact parts 1722 to the lens module 120.

The preload element 180 is a flat spring located between the base 112 and the reflection module 150 and connected to the base 112 and the reflective element holder 151 of the reflection module 150. The preload element 180 is configured to provide a preload force to the reflective element holder 151 in a direction towards the base 112, such that the shaft guiding bar 133 supports the reflection module 150.

The damping element 190 is disposed between the preload element 180 and the base 112, and the damping element 190 is configured to absorb the vibration of the reflection module 150.

In this embodiment, the longitudinal guiding bars 131 are made of ferromagnetic material, and the longitudinal guiding bars 131 correspond to the second driving magnets 1621 so as to together provide a force of attraction to the lens module 120 in a direction towards the base 112, such that the longitudinal guiding bars 131 and the transverse guiding bars 132 support the lens module 120.

In this embodiment, the longitudinal guiding bars 131, the transverse guiding bars 132 and the shaft guiding bar 133 are all cylindrical.

When a maximum field of view of the lens module 120 is FOV, the following condition is satisfied: 3 degrees<FOV<40 degrees.

When a length of each of the longitudinal guiding bars 131 is L1, and a length of each of the transverse guiding bars 132 is L2, the following conditions are satisfied: L1=7 mm; L2=3.7 mm; and L2/L1=0.53.

In this embodiment, the camera module 10 includes the longitudinal guiding bars 131, the transverse guiding bars 132 and the shaft guiding bar 133, such that the lens module 120 can be driven to move in the first direction D1 and the second direction D2, and the reflective element 152 of the reflection module 150 can be driven to rotate by taking the shaft guiding bar 133 as a rotation axis, but the present disclosure is not limited thereto. In other configuration, the camera module can only include, for example, two of the longitudinal guiding bar, the transverse guiding bar and the shaft guiding bar according to actual requirements of image focusing and image stabilization in a certain dimension.

2nd Embodiment

Figure 8:
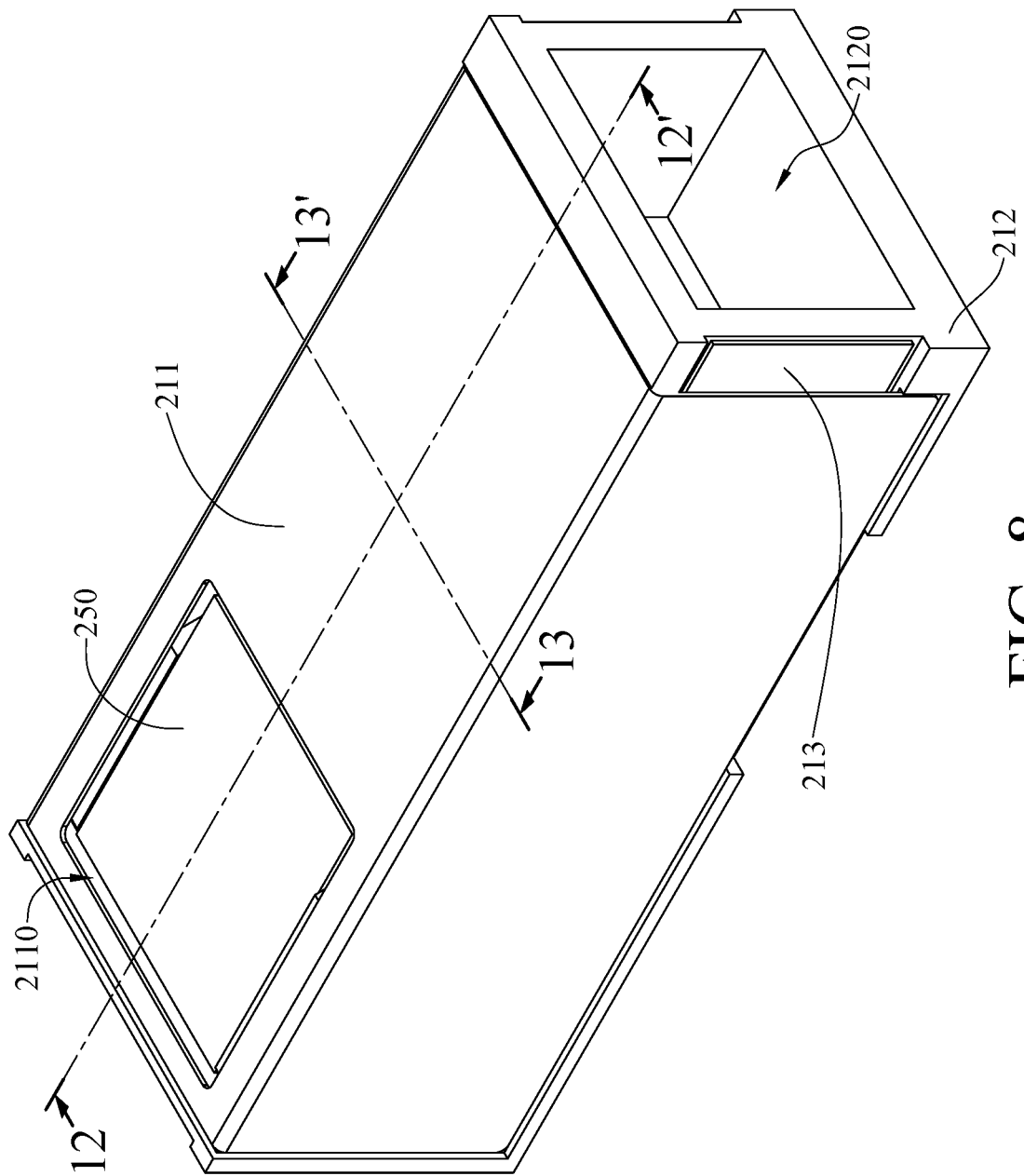
FIG. 8 is a perspective view of a camera module according to the 2nd embodiment of the present disclosure.
Figure 9:
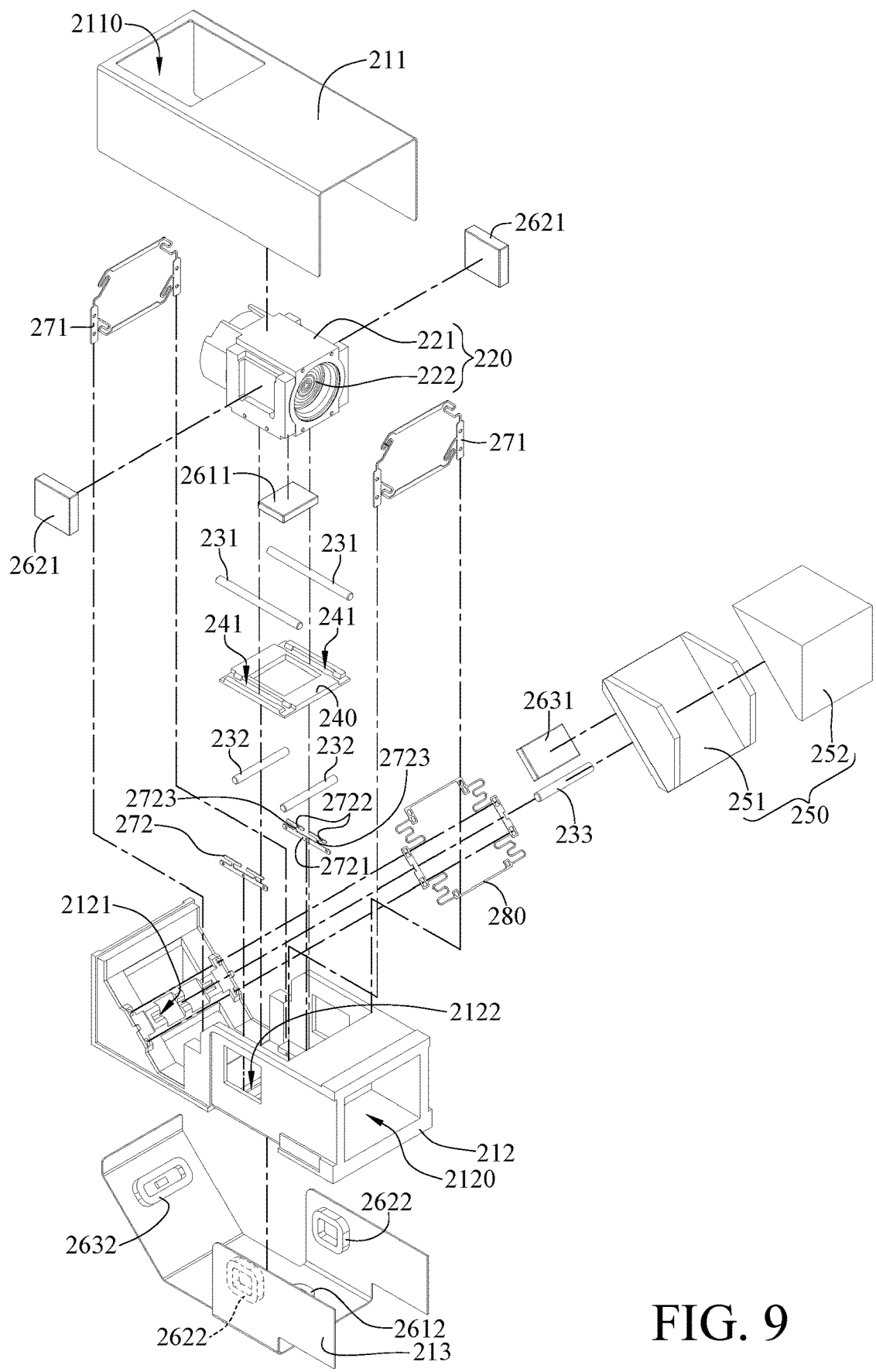
FIG. 9 is an exploded view of the camera module in FIG. 8.
Figure 10:
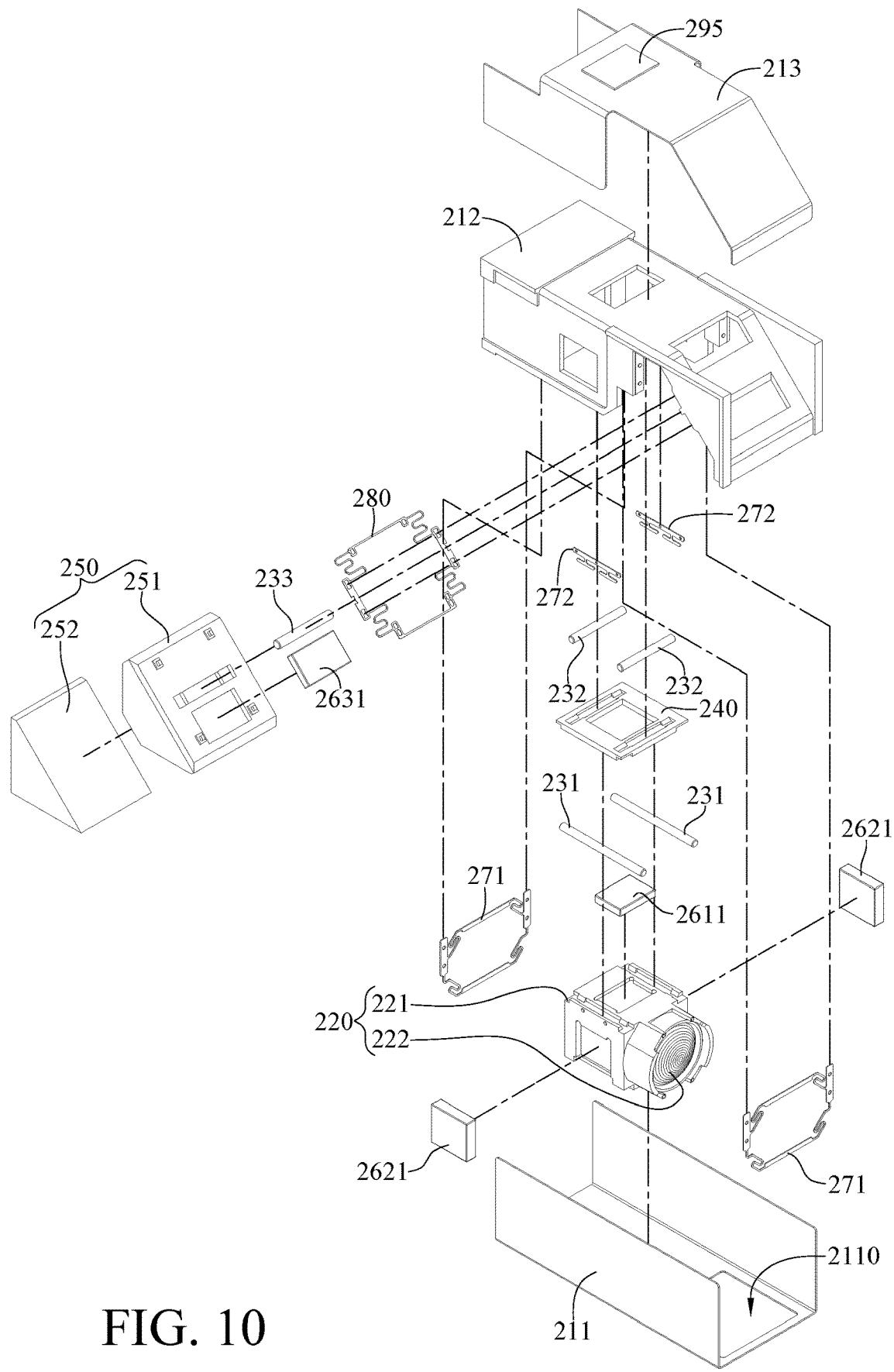
FIG. 10 is another exploded view of the camera module in FIG. 8.
Figure 11:
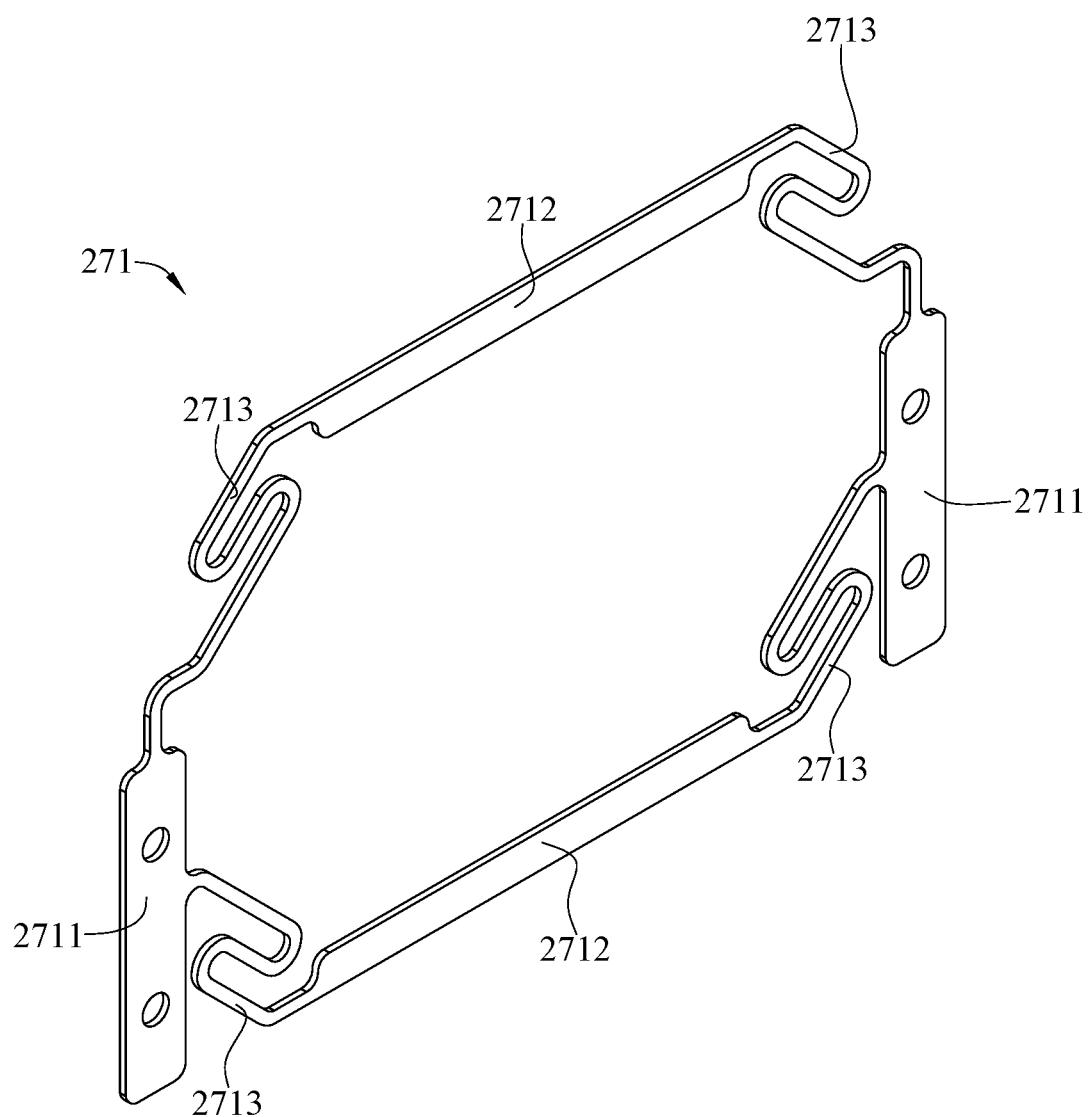
FIG. 11 is a perspective view of one of the first cushion elements in FIG. 9.
Figure 12:
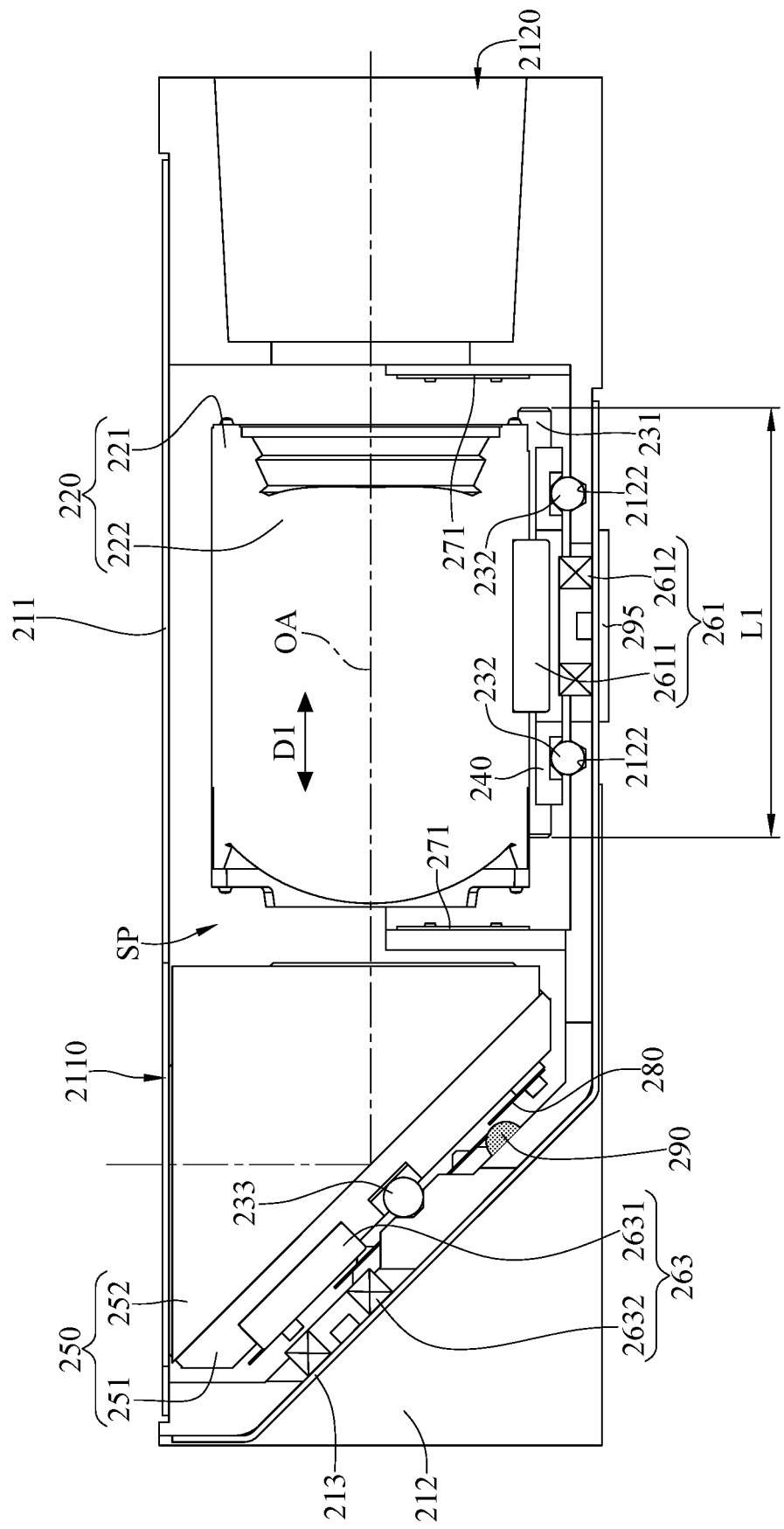
FIG. 12 is a cross-sectional view of the camera module along line 12-12' in FIG. 8.
Figure 13:
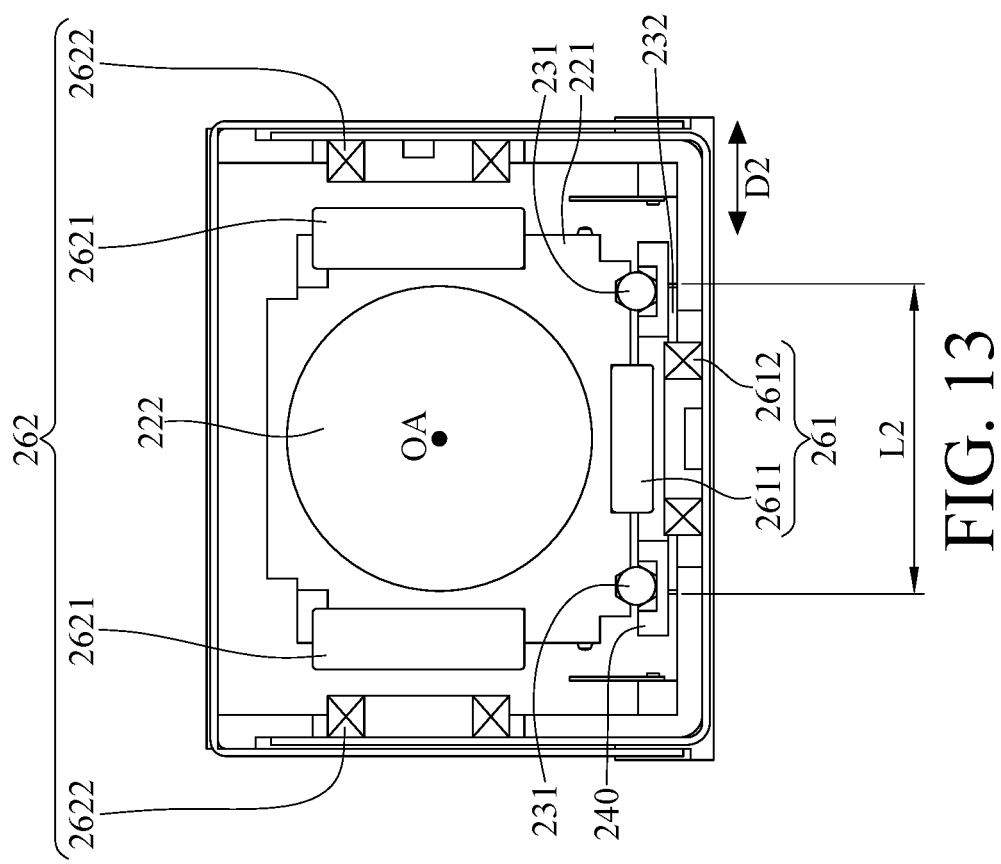
FIG. 13 is a cross-sectional view of the camera module along line 13-13' in FIG. 8.

Please refer to FIG. 8 to FIG. 13, where FIG. 8 is a perspective view of a camera module according to the 2nd embodiment of the present disclosure, FIG. 9 is an exploded view of the camera module in FIG. 8, FIG. 10 is another exploded view of the camera module in FIG. 8, FIG. 11 is a perspective view of one of the first cushion elements in FIG. 9, FIG. 12 is a cross-sectional view of the camera module along line 12-12' in FIG. 8, and FIG. 13 is a cross-sectional view of the camera module along line 13-13' in FIG. 8.

A camera module 20 includes a casing 211, a base 212, a lens module 220, two longitudinal guiding bars 231, a movable frame 240, two transverse guiding bars 232, a reflection module 250, a shaft guiding bar 233, a printed circuit board 213, a first driving mechanism 261, a second driving mechanism 262, a rotation driving mechanism 263, two first cushion elements 271, two second cushion elements 272, a preload element 280, a damping element 290 and a ferromagnetic element 295.

The casing 211 is disposed on the base 212, and the casing 211 and the base 212 together form a storage space SP. The casing 211 has an aperture 2110 for light entering, and the base 212 has an opening 2120 for light exiting.

The lens module 220 has an optical axis OA, and the lens module 220 includes a lens element holder 221 and at least one lens element 222. The lens element holder 221 is located in the storage space SP and movably disposed on the base 212, and the at least one lens element 222 is disposed on the lens element holder 221.

The longitudinal guiding bars 231 are disposed between the base 212 and the lens module 220 and fixed to the lens element holder 221 of the lens module 220, and the longitudinal guiding bars 231 extend in a first direction D1 that is parallel to the optical axis OA.

The movable frame 240 is disposed between the longitudinal guiding bars 231 and the base 212. The movable frame 240 has two first grooves 241 extending in the first direction D1, the first grooves 241 respectively correspond to the longitudinal guiding bars 231, and the longitudinal guiding bars 231 are slidably located in the first grooves 241, such that the lens module 220 is slidably disposed on the movable frame 240 and movable along the longitudinal guiding bars 231. The lens module 220 is movable in the first direction D1 with the guidance of the longitudinal guiding bars 231.

The transverse guiding bars 232 are disposed between the movable frame 240 and the base 212 and fixed to the movable frame 240, and the transverse guiding bars 232 extend in a second direction D2 that is perpendicular to the optical axis OA. The base 212 has two second grooves 2122 extending in the second direction D2, the second grooves 2122 respectively correspond to the transverse guiding bars 232, and the transverse guiding bars 232 are slidably located in the second grooves 2122, such that the movable frame 240 is slidably disposed on the base 212 and movable along the transverse guiding bars 232. The movable frame 240 is movable in the second direction D2 with the guidance of the transverse guiding bars 232. Further, when the movable frame 240 is moved along the transverse guiding bars 232, the lens module 220 is also driven by the movable frame 240 to move along the transverse guiding bars 232, such that the lens module 220 is movable along the longitudinal guiding bars 231 and the transverse guiding bars 232, respectively, so as to achieve image focusing and image stabilization in one dimension.

The reflection module 250 includes a reflective element holder 251 and a reflective element 252. The reflective element holder 251 is disposed on the base 212. The reflective element 252 is a prism configured to deflect an optical path of incident light, and the reflective element 252 is disposed on the reflective element holder 251 and located on an object side of the lens module 220.

The shaft guiding bar 233 is disposed between the base 212 and the reflection module 250 and fixed to the reflective element holder 251. The shaft guiding bar 233 extends in the second direction D2. The base 212 has a corresponding groove 2121 extending in the second direction D2, the corresponding groove 2121 corresponds to the shaft guiding bar 233, and the shaft guiding bar 233 is rotatably located in the corresponding groove 2121, such that the reflective element 252 is rotatably disposed on the base 212 and rotatable by taking the shaft guiding bar 233 as a rotation axis so as to achieve image stabilization in another dimension.

The printed circuit board 213 is disposed on the base 212 and configured to provide driving current for driving coil(s).

The first driving mechanism 261 includes a first driving magnet 2611 and a first driving coil 2612. The first driving magnet 2611 is disposed on the lens module 220, and the first driving coil 2612 is disposed on the printed circuit board 213 and corresponds to the first driving magnet 2611. The printed circuit board 213 can provide driving current for the first driving coil 2612, and an electromagnetic force generated between the first driving magnet 2611 and the first driving coil 2612 can drive the first driving magnet 2611 to move in the first direction D1 so as to drive the lens module 220 to move in the first direction D1.

The second driving mechanism 262 includes two second driving magnets 2621 and two second driving coils 2622. The second driving magnets 2621 are disposed on two opposite sides of the lens module 220 and located on two sides adjacent to the first driving magnet 2611, the second driving coils 2622 are disposed on two opposite sides of the printed circuit board 213 and located on two sides adjacent to the first driving coil 2612, and the second driving coils 2622 respectively correspond to the second driving magnets 2621. The printed circuit board 213 can provide driving current to the second driving coils 2622, and an electromagnetic force generated between the second driving magnets 2621 and the second driving coils 2622 can drive the second driving magnets 2621 to move in the second direction D2 so as to drive the lens module 220 to move in the second direction D2.

The rotation driving mechanism 263 includes a rotation driving magnet 2631 and a rotation driving coil 2632. The rotation driving magnet 2631 is disposed on the reflective element holder 251 of the reflection module 250 and located on one side of the shaft guiding bar 233, and the rotation driving coil 2632 is disposed on the printed circuit board 213 and corresponds to the rotation driving magnet 2631. The printed circuit board 213 can provide driving current to the rotation driving coil 2632, and an electromagnetic force generated between the rotation driving magnet 2631 and the rotation driving coil 2632 can drive the rotation driving magnet 2631 to rotate by taking the shaft guiding bar 233 as a rotation axis so as to drive the reflection module 250 to rotate by taking the shaft guiding bar 233 as a rotation axis. In this embodiment, the first driving mechanism 261 provides a driving force that makes the coil and magnet thereof have a substantially parallel displacement with respect to each other; each of the second driving mechanism 262 and the rotation driving mechanism 263 provides a driving force that makes the coil(s) and magnet(s) thereof have a substantially perpendicular displacement with respect to each other.

Each of the first cushion elements 271 includes two fixed parts 2711, two contact parts 2712 and four elastic parts 2713 connected to the fixed parts 2711 and the contact parts 2712. The fixed parts 2711 are fixed to the base 212, and the contact parts 2712 correspond to the lens module 220. The first cushion elements 271 are configured to restrict the movement in the first direction D1 of the lens module 220 within a predetermined range, and when the lens module 220 is moved along the longitudinal guiding bars 231, the first cushion elements 271 can prevent the lens module 220 from hitting the base 212 by the blocking of the contact parts 2712.

Each of the second cushion elements 272 includes a fixed part 2721, two contact parts 2722 and two elastic parts 2723 connected to the fixed part 2721 and the contact parts 2722. The fixed part 2721 is fixed to the lens module 220, and the contact parts 2722 correspond to the movable frame 240. The second cushion elements 272 are configured to restrict the movement in the second direction D2 of the lens module 220 within a predetermined range, and when the lens module 220 is moved along the transverse guiding bars 232, the second cushion elements 272 can prevent the lens module 220 from hitting the base 212 by the blocking of the contact parts 2722 to the lens module 220.

The preload element 280 is a flat spring located between the base 212 and the reflection module 250 and connected to the base 212 and the reflective element holder 251 of the reflection module 250. The preload element 280 is configured to provide a preload force to the reflective element holder 251 in a direction towards the base 212, such that the shaft guiding bar 233 supports the reflection module 250.

The damping element 290 is disposed between the preload element 280 and the base 212, and the damping element 290 is configured to absorb the vibration of the reflection module 250.

The ferromagnetic element 295 is disposed on the base 212, and the ferromagnetic element 295 corresponds to the first driving magnet 2611 so as to together provide a force of attraction to the lens module 220 in a direction towards the base 212, such that the longitudinal guiding bars 231 and the transverse guiding bars 232 support the lens module 220.

In this embodiment, the longitudinal guiding bars 231, the transverse guiding bars 232 and the shaft guiding bar 233 are all cylindrical.

When a maximum field of view of the lens module 220 is FOV, the following condition is satisfied: 3 degrees<FOV<40 degrees.

When a length of each of the longitudinal guiding bars 231 is L1, and a length of each of the transverse guiding bars 232 is L2, the following conditions are satisfied: L1=6.5 mm; L2=4.1 mm; and L2/L1=0.63.

3rd Embodiment

Figure 14:
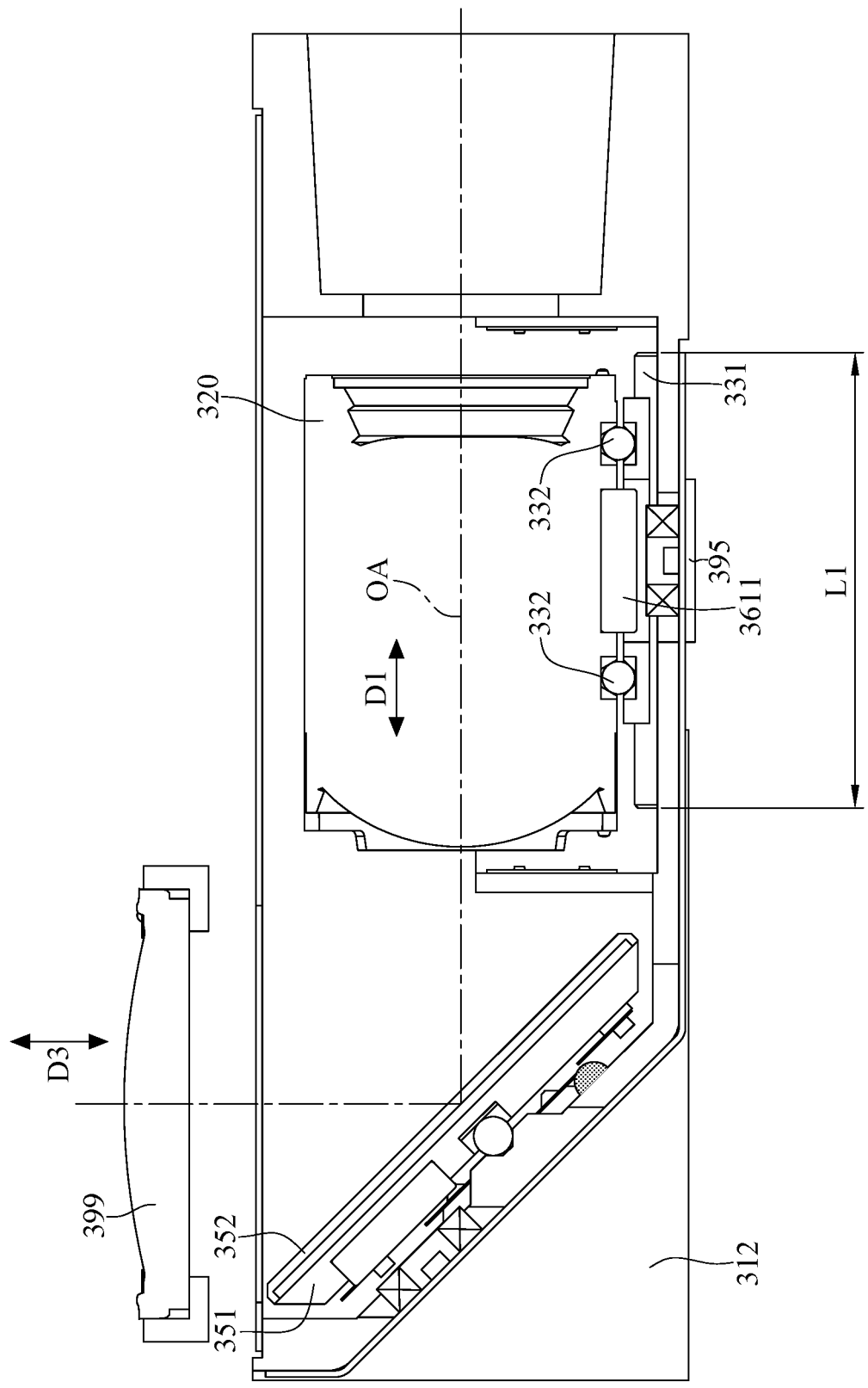
FIG. 14 is a cross-sectional view of a camera module according to the 3rd embodiment of the present disclosure.
Figure 15:
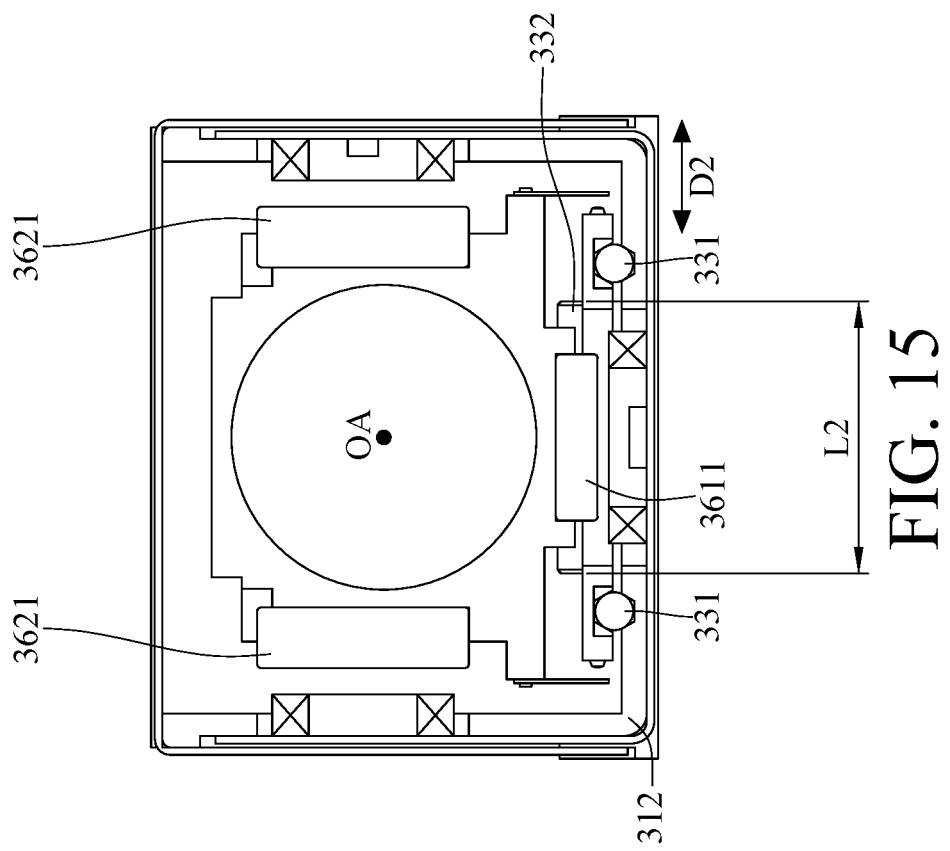
FIG. 15 is another cross-sectional view of the camera module according to the 3rd embodiment of the present disclosure.

Please refer to FIG. 14 and FIG. 15, where FIG. 14 is a cross-sectional view of a camera module according to the 3rd embodiment of the present disclosure, and FIG. 15 is another cross-sectional view of the camera module according to the 3rd embodiment of the present disclosure.

In this embodiment, a camera module 30 is provided, and the camera module 30 has a configuration similar to that of the camera module 10 disclosed in the 1st embodiment. Only differences between the camera module 30 and the camera module 10 would be described below.

In this embodiment, compared to the camera module 10, the camera module 30 further includes a ferromagnetic element 395 and an object-side lens element 399.

The ferromagnetic element 395 is disposed on a base 312, and the ferromagnetic element 395 corresponds to a first driving magnet 3611 so as to together provide a force of attraction to a lens module 320 in a direction towards the base 312. In addition, two longitudinal guiding bars 331 are made of ferromagnetic material corresponding to two second driving magnets 3621 so as to together provide a force of attraction to the lens module 320 in a direction towards base 312. As such, the ferromagnetic element 395, the first driving magnet 3611, the longitudinal guiding bars 331 and the second driving magnets 3621 together provide a force of attraction to the lens module 320 in a direction towards the base 312, such that the longitudinal guiding bars 331 and two transverse guiding bars 332 support the lens module 320.

The object-side lens element 399 is located on an object side of a reflective element 352 and disposed adjacent to the reflective element 352 in a third direction D3, wherein the third direction D3 is perpendicular to a first direction D1 and perpendicular to a second direction D2.

In this embodiment, the reflective element 352 is a reflective mirror configured to deflect an optical path of incident light, and the reflective element 352 is disposed on a reflective element holder 351 and located on an object side of the lens module 320.

When a length of each of the longitudinal guiding bars 331 is L1, and a length of each of transverse guiding bars 332 is L2, the following conditions are satisfied: L1=7 mm; L2=3.6 mm; and L2/L1=0.51.

4th Embodiment

Figure 16:
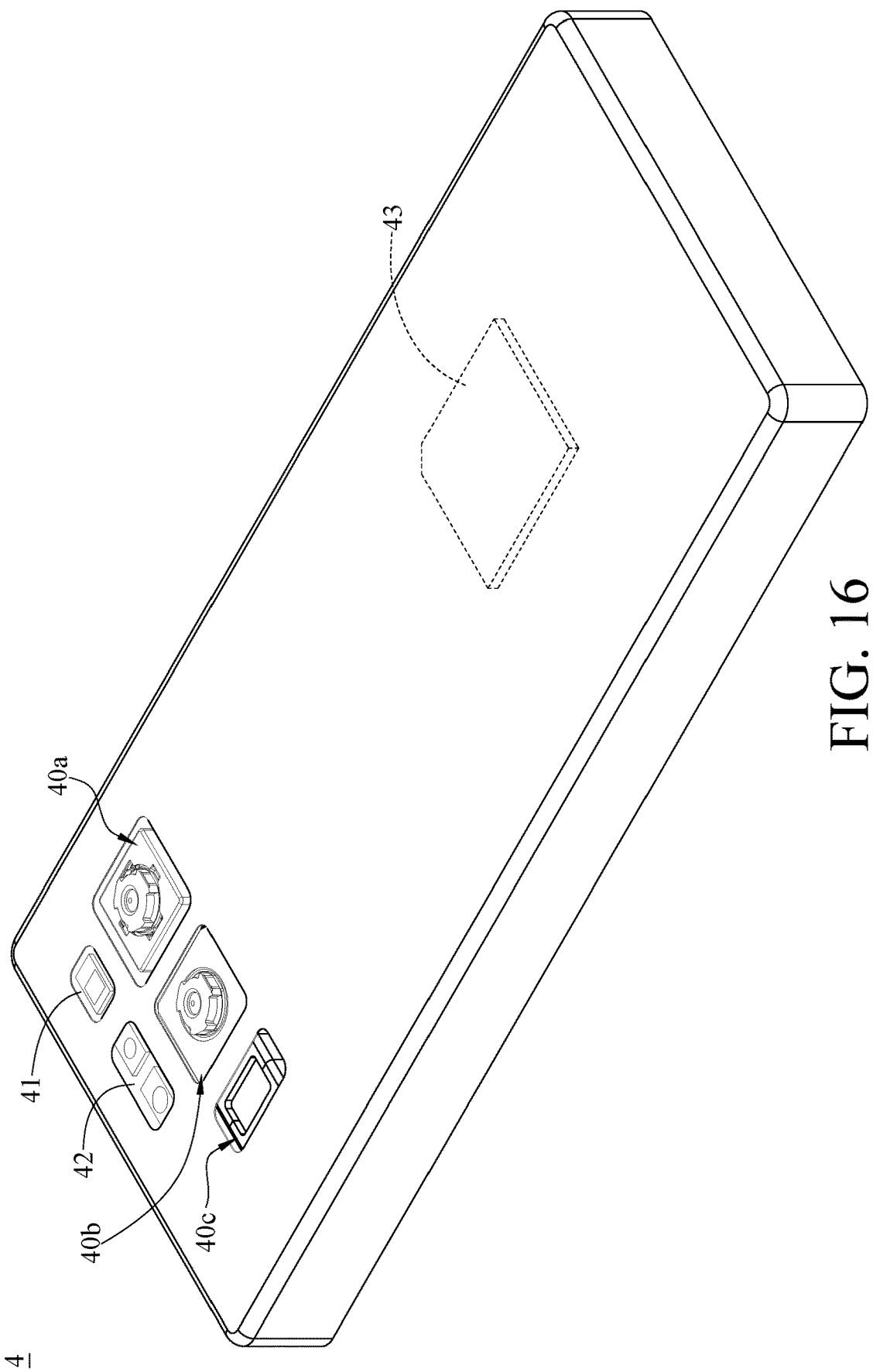
FIG. 16 is one perspective view of an electronic device according to the 4th embodiment of the present disclosure.
Figure 17:
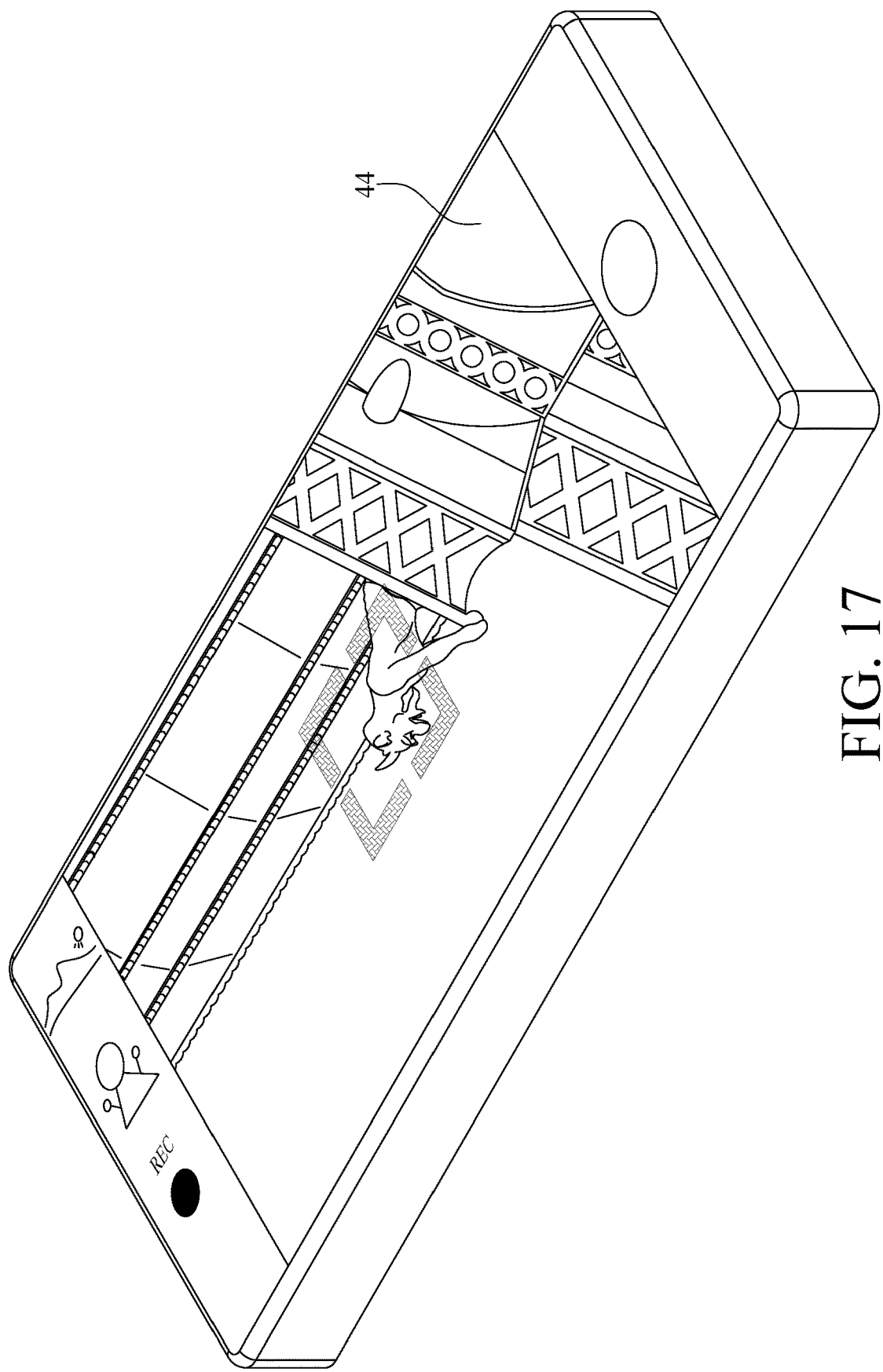
FIG. 17 is another perspective view of the electronic device in FIG. 16.

Please refer to FIG. 16 and FIG. 17, where FIG. 16 is one perspective view of an electronic device according to the 4th embodiment of the present disclosure, and FIG. 17 is another perspective view of the electronic device in FIG. 16.

In this embodiment, an electronic device 4 is a smartphone including a plurality of camera modules, a flash module 41, a focus assist module 42, an image signal processor 43, a display unit (a user interface) 44 and an image software processor (not shown).

The camera modules include an ultra-wide-angle camera module 40a, a high pixel camera module 40b and a telephoto camera module 40c. The camera module disclosed in the 1st embodiment is taken as the telephoto camera module 40c, but the present disclosure is not limited thereto. Camera modules disclosed in other embodiments can also be taken as the telephoto camera module 40c.

Figure 18:
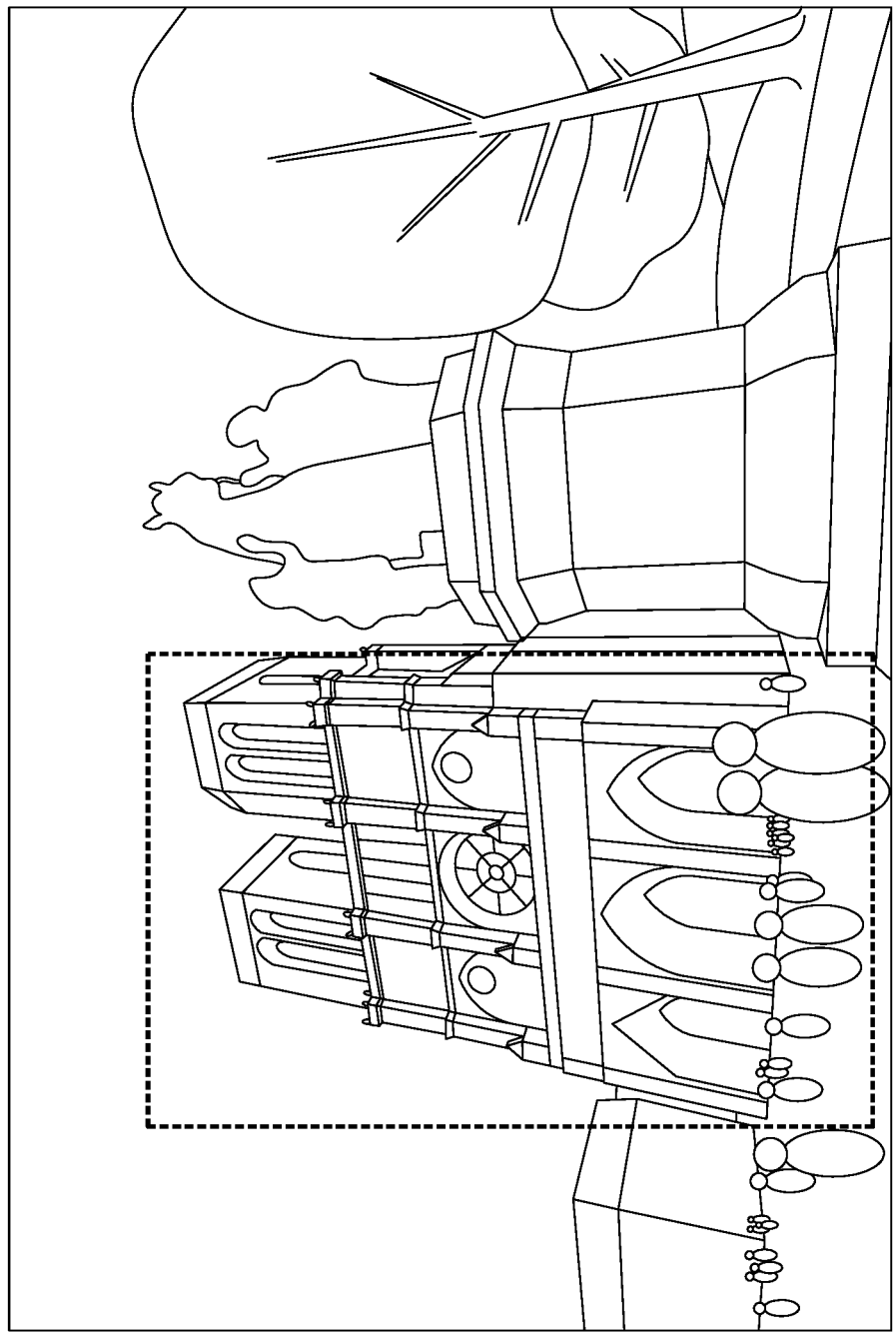
FIG. 18 is an image captured by an ultra-wide-angle camera module.

The image captured by the ultra-wide-angle camera module 40a enjoys a feature of multiple imaged objects. FIG. 18 is an image captured by the ultra-wide-angle camera module 40a.

Figure 19:
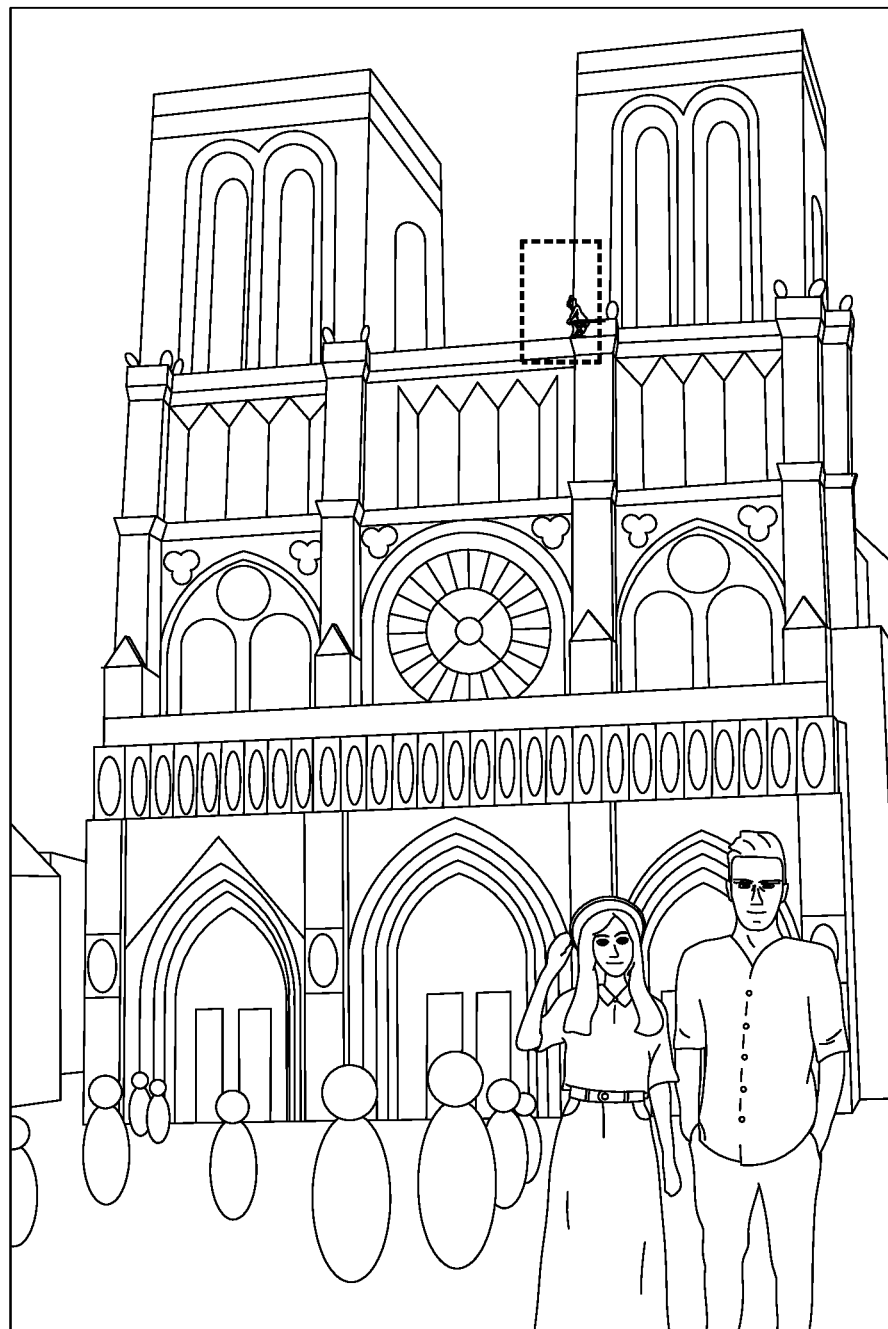
FIG. 19 is an image captured by a high pixel camera module.

The image captured by the high pixel camera module 40b enjoys a feature of high resolution and less distortion, and the high pixel camera module 40b can capture part of the image in FIG. 18. FIG. 19 is an image captured by the high pixel camera module 40b.

Figure 20:
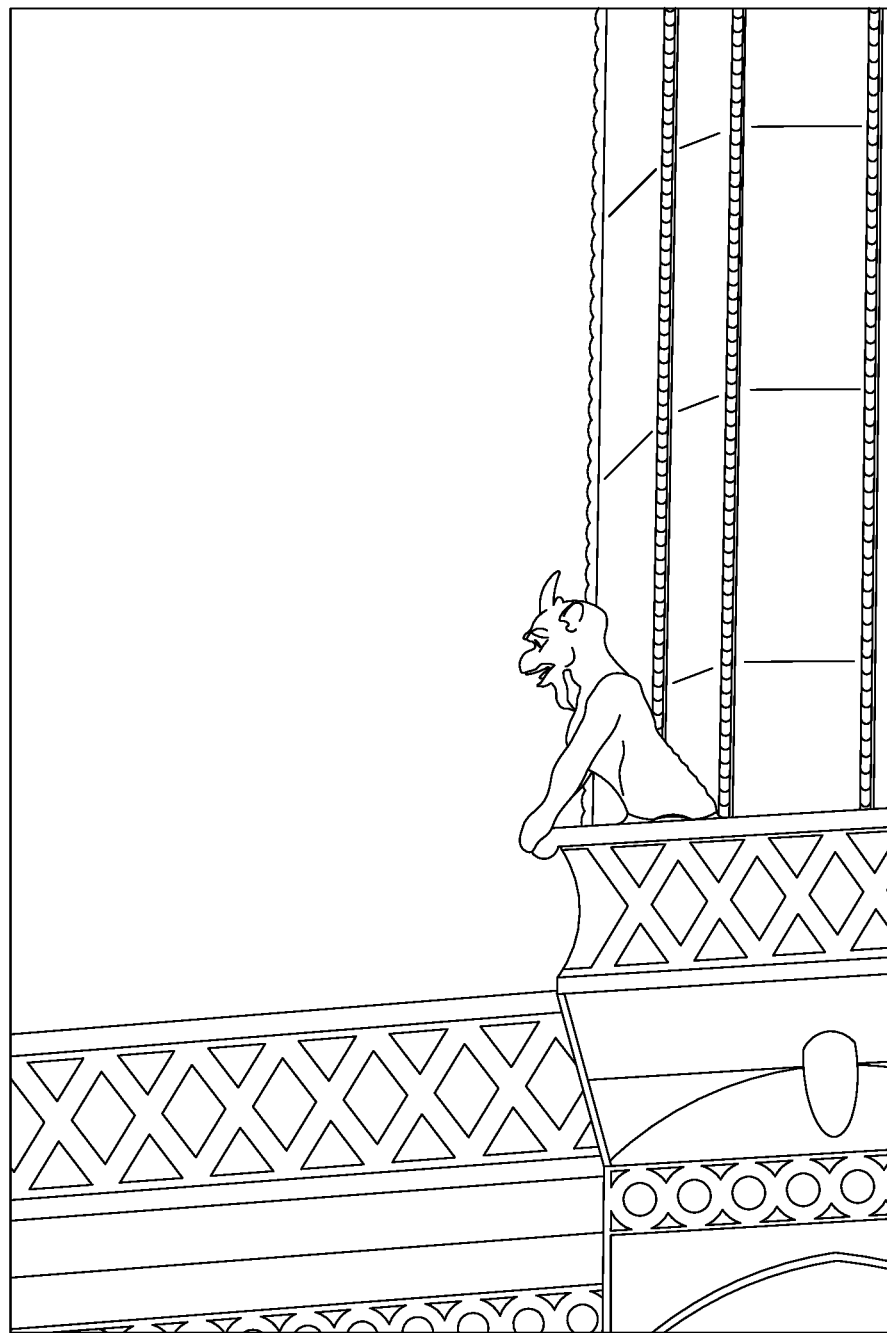
FIG. 20 is an image captured by a telephoto camera module.

The image captured by the telephoto camera module 40c enjoys a feature of high optical magnification, and the telephoto camera module 40c can capture part of the image in FIG. 19. FIG. 20 is an image captured by the telephoto camera module 40c. The maximum field of view (FOV) of the camera module corresponds to the field of view in FIG. 20.

When a user captures images of an object, the light rays converge in the ultra-wide-angle camera module 40a, the high pixel camera module 40b or the telephoto camera module 40c to generate an image(s), and the flash module 41 is activated for light supplement. The focus assist module 42 detects the object distance of the imaged object to achieve fast auto focusing. The image signal processor 43 is configured to optimize the captured image to improve image quality and provided zooming function. The light beam emitted from the focus assist module 42 can be either conventional infrared or laser. The display unit 44 can be a touch screen or a physical button. The user is able to interact with the display unit 44 and the image software processor having multiple functions to capture images and complete image processing. The image processed by the image software processor can be displayed on the display unit 44.

5th Embodiment

Figure 21:
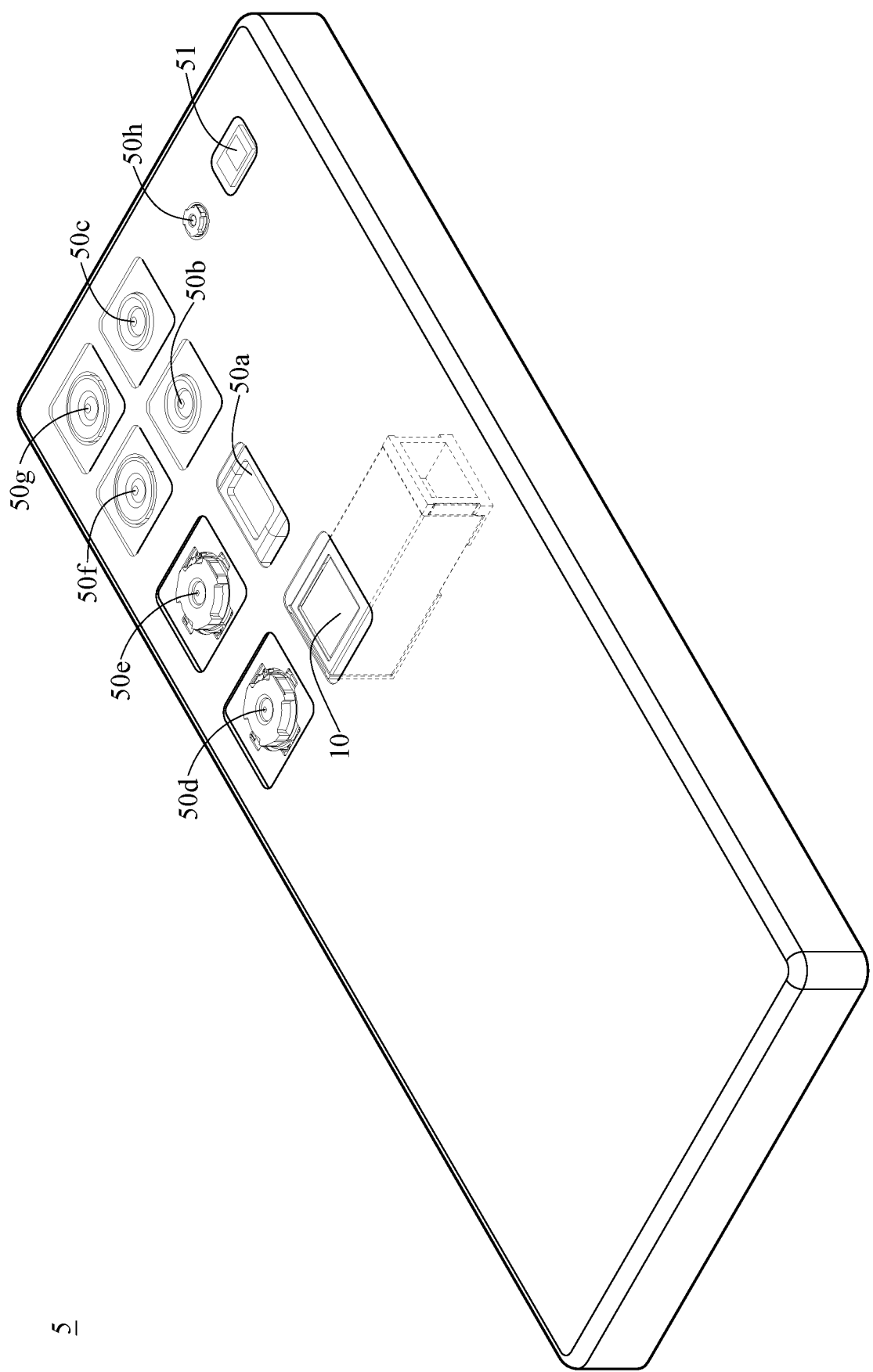
FIG. 21 is one perspective view of an electronic device according to the 5th embodiment of the present disclosure.

Please refer to FIG. 21, which is one perspective view of an electronic device according to the 5th embodiment of the present disclosure.

In this embodiment, an electronic device 5 is a smartphone including the camera module 10 disclosed in the 1st embodiment, a camera module 50a, a camera module 50b, a camera module 50c, a camera module 50d, a camera module 50e, a camera module 50f, a camera module 50g, a camera module 50h, a flash module 51, an image signal processor, a display unit and an image software processor (not shown). The camera module 10, the camera module 50a, the camera module 50b, the camera module 50c, the camera module 50d, the camera module 50e, the camera module 50f, the camera module 50g and the camera module 50h are disposed on the same side of the electronic device 5, while the display unit is disposed on the opposite side of the electronic device 5.

The camera module 10 is a telephoto camera module, the camera module 50a is a telephoto camera module, the camera module 50b is a telephoto camera module, the camera module 50c is a telephoto camera module, the camera module 50d is a wide-angle camera module, the camera module 50e is a wide-angle camera module, the camera module 50f is an ultra-wide-angle camera module, the camera module 50g is an ultra-wide-angle camera module, and the camera module 50h is a ToF (time of flight) camera module. In this embodiment, the camera module 10, the camera module 50a, the camera module 50b, the camera module 50c, the camera module 50d, the camera module 50e, the camera module 50f and the camera module 50g have different fields of view, such that the electronic device 5 can have various magnification ratios so as to meet the requirement of optical zoom functionality. In addition, the camera module 10 and the camera module 50a are telephoto camera modules having a light-folding element configuration. In addition, the camera module 50h can determine depth information of the imaged object. In this embodiment, the electronic device 5 includes a plurality of camera modules 10, 50a, 50b, 50c, 50d, 50e, 50f, 50g, and 50h, but the present disclosure is not limited to the number and arrangement of camera module. When a user captures images of an object, the light rays converge in the camera modules 10, 50a, 50b, 50c, 50d, 50e, 50f, 50g or 50h to generate an image(s), and the flash module 51 is activated for light supplement. Further, the subsequent processes are performed in a manner similar to the abovementioned embodiments, so the details in this regard will not be provided again.

The smartphones in the embodiments are only exemplary for showing the camera modules 10, 20, 30 of the present disclosure installed in an electronic device, and the present disclosure is not limited thereto. The camera modules 10, 20, 30 can be optionally applied to optical systems with a movable focus. Furthermore, the camera modules 10, 20, 30 feature good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A camera module, comprising:
   a base;
   a lens module, having an optical axis, and the lens module being disposed on the base;
   a reflection module, comprising a reflective element, the reflective element being disposed on the base, and the reflective element located on an object side of the lens module;
   a longitudinal guiding bar, disposed between the base and the lens module, and the longitudinal guiding bar extending in a first direction parallel to the optical axis;
   a transverse guiding bar, disposed between the base and the lens module, and the transverse guiding bar extending in a second direction perpendicular to the optical axis; and
   a shaft guiding bar, disposed between the base and the reflection module, and the shaft guiding bar extending in the second direction;
   wherein the lens module is movable along the longitudinal guiding bar and the transverse guiding bar, respectively, and the reflective element is rotatable by taking the shaft guiding bar as a rotation axis;
   wherein the camera module further comprises a movable frame disposed between the longitudinal guiding bar and the transverse guiding bar, and the movable frame is movable along one of the longitudinal guiding bar and the transverse guiding bar.

2. The camera module of claim 1, further comprising at least one cushion element, wherein the cushion element comprises a fixed part, a contact part and an elastic part, the fixed part is fixed to one of the base and the lens module, the contact part corresponds to other of the base and the lens module, and the elastic part is connected to the fixed part and the contact part.

3. The camera module of claim 1, further comprising at least one cushion element, wherein the cushion element comprises a fixed part, a contact part and an elastic part, the fixed part is fixed to one of the movable frame and the lens module, the contact part corresponds to other of the movable frame and the lens module, and the elastic part is connected to the fixed part and the contact part.

4. The camera module of claim 1, further comprising a first driving mechanism, wherein the first driving mechanism comprises a first driving magnet and a first driving coil, the first driving magnet is disposed on the lens module, the first driving coil corresponds to the first driving magnet, and the first driving mechanism is configured to drive the lens module to move along the first direction.

5. The camera module of claim 4, further comprising a second driving mechanism, wherein the second driving mechanism comprises a second driving magnet and a second driving coil, the second driving magnet is disposed on the lens module, the second driving coil corresponds to the second driving magnet, and the second driving mechanism is configured to drive the lens module to move along the second direction.

6. The camera module of claim 5, further comprising a ferromagnetic element, wherein the ferromagnetic element is disposed on the base, the ferromagnetic element corresponds to one of the first driving magnet and the second driving magnet so as to together provide a force of attraction to the lens module in a direction towards the base, such that the longitudinal guiding bar and the transverse guiding bar support the lens module.

7. The camera module of claim 5, wherein one of the longitudinal guiding bar and the transverse guiding bar is made of ferromagnetic material, is fixed to the base and corresponds to one of the first driving magnet and the second driving magnet so as to together provide a force of attraction to the lens module in a direction towards the base, such that the longitudinal guiding bar and the transverse guiding bar support the lens module.

8. The camera module of claim 1, further comprising a rotation driving mechanism, wherein the rotation driving mechanism comprises a rotation driving magnet and a rotation driving coil, the rotation driving magnet is disposed on the reflection module, the rotation driving coil corresponds to the rotation driving magnet, and the rotation driving mechanism is configured to drive the reflection module to rotate by taking the shaft guiding bar as a rotation axis.

9. The camera module of claim 1, further comprising a preload element, wherein the preload element is connected to the base and the reflection module, and the preload element is configured to provide a preload force to the reflection module in a direction towards the base, such that the shaft guiding bar located between the base and the reflection module supports the reflection module.

10. The camera module of claim 9, further comprising a damping element, wherein the damping element is disposed between the preload element and the base.

11. The camera module of claim 1, wherein the longitudinal guiding bar and the transverse guiding bar are both cylindrical.

12. The camera module of claim 1, wherein the shaft guiding bar is cylindrical.

13. The camera module of claim 1, wherein a maximum field of view of the lens module is FOV, and the following condition is satisfied:
   3 degrees<FOV<40 degrees.

14. The camera module of claim 1, wherein a length of the longitudinal guiding bar is L1, a length of the transverse guiding bar is L2, and the following condition is satisfied:
   0.1<L2/L1<2.0.

15. An electronic device, comprising:
   the camera module of claim 1.

16. A camera module, comprising:
   a base;
   a lens module, having an optical axis, and the lens module being disposed on the base;
   a reflection module, comprising a reflective element, the reflective element being disposed on the base, and the reflective element located on an object side of the lens module;
   a longitudinal guiding bar, disposed between the base and the lens module, and the longitudinal guiding bar extending in a first direction parallel to the optical axis; and a shaft guiding bar, disposed between the base and the reflection module, and the shaft guiding bar extending in a second direction perpendicular to the optical axis;

wherein the lens module is movable along the longitudinal guiding bar, and the reflective element is rotatable by taking the shaft guiding bar as a rotation axis;

wherein the camera module further comprises a preload element connected to the base and the reflection module, the preload element is configured to provide a preload force to the reflection module in a direction towards the base, such that the shaft guiding bar located between the base and the reflection module supports the reflection module;

wherein the camera module further comprises a damping element disposed between the preload element and the base, and the damping element is directly in contact with the preload element and the base.

17. A camera module, comprising:

a base;

a lens module, having an optical axis, and the lens module being disposed on the base;

a reflection module, comprising a reflective element, the reflective element being disposed on the base, and the reflective element located on an object side of the lens module;

a transverse guiding bar, disposed between the base and the lens module, and the transverse guiding bar extending in a direction perpendicular to the optical axis; and a shaft guiding bar, disposed between the base and the reflection module, and the shaft guiding bar extending in the direction perpendicular to the optical axis;

wherein the lens module is movable along the transverse guiding bar, and the reflective element is rotatable by taking the shaft guiding bar as a rotation axis;

wherein the camera module further comprises a preload element connected to the base and the reflection module, the preload element is configured to provide a preload force to the reflection module in a direction towards the base, such that the shaft guiding bar located between the base and the reflection module supports the reflection module;

wherein the camera module further comprises a damping element disposed between the preload element and the base, and the damping element is directly in contact with the preload element and the base.

18. A camera module, comprising:

a base;

a lens module, having an optical axis, and the lens module being disposed on the base;

a reflection module, comprising a reflective element, the reflective element being disposed on the base, and the reflective element located on an object side of the lens module;

a longitudinal guiding bar, disposed between the base and the lens module, and the longitudinal guiding bar extending in a first direction parallel to the optical axis; and a transverse guiding bar, disposed between the base and the lens module, and the transverse guiding bar extending in a second direction perpendicular to the optical axis;

wherein the lens module is movable along the longitudinal guiding bar and the transverse guiding bar, respectively;

wherein the camera module further comprises a movable frame disposed between the longitudinal guiding bar and the transverse guiding bar, and the movable frame is movable along one of the longitudinal guiding bar and the transverse guiding bar.

* * * * *